US009495158B2

(12) United States Patent
Stark

(10) Patent No.: US 9,495,158 B2
(45) Date of Patent: Nov. 15, 2016

(54) MULTI-PROCESSOR SYSTEM HAVING TRIPWIRE DATA MERGING AND COLLISION DETECTION

(71) Applicant: Netronome Systems, Inc., Santa Clara, CA (US)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 333 days.

(21) Appl. No.: 14/311,217

(22) Filed: Jun. 20, 2014

(65) Prior Publication Data

US 2015/0370563 A1 Dec. 24, 2015

(51) Int. Cl.
*G06F 15/00* (2006.01)
*G06F 9/30* (2006.01)
*G06F 15/82* (2006.01)
*G06F 11/36* (2006.01)

(52) U.S. Cl.
CPC ....... *G06F 9/30101* (2013.01); *G06F 9/30145* (2013.01); *G06F 11/3644* (2013.01); *G06F 11/3648* (2013.01); *G06F 15/82* (2013.01)

(58) Field of Classification Search
None
See application file for complete search history.

(56) References Cited

U.S. PATENT DOCUMENTS 4,429,368 A * 1/1984 Kurii .................. G06F 11/3648 714/38.12
2007/0294585 A1* 12/2007 Mandal .............. G06F 11/3648 714/38.13
2010/0251022 A1* 9/2010 Sato .................... G06F 11/3648 714/30
2014/0201403 A1* 7/2014 Sato .................... G06F 11/3648 710/107

* cited by examiner

*Primary Examiner* — Corey S Faherty
(74) *Attorney, Agent, or Firm* — Imperium Patent Works LLP; T. Lester Wallace; Mark D. Marrello

(57) ABSTRACT

An integrated circuit includes a pool of processors and a Tripwire Data Merging and Collision Detection Circuit (TDMCDC). Each processor has a special tripwire bus port. Execution of a novel tripwire instruction causes the processor to output a tripwire value onto its tripwire bus port. Each respective tripwire bus port is coupled to a corresponding respective one of a plurality of tripwire bus inputs of the TDMCDC. The TDMCDC receives tripwire values from the processors and communicates them onto a consolidated tripwire bus. From the consolidated bus the values are communicated out of the integrated circuit and to a debug station. If more than one processor outputs a valid tripwire value at a given time, then the TDMCDC asserts a collision bit signal that is communicated along with the tripwire value. Receiving tripwire values onto the debug station facilitates use of the debug station in monitoring and debugging processor code.

20 Claims, 31 Drawing Sheets

| FIELD | WIDTH | DESCRIPTION |
|---|---|---|
| VALID BIT | 1 | VALID TRIPWIRE VALUE PRESENT ON THE TRIPWIRE BUS. |
| PICOENGINE NUMBER | 6 | HARDWIRED NUMBER THAT IDENTIFIES THE PICOENGINE THAT GENERATED THE TRIPWIRE DATA. |
| HIT BIT | 1 | INDICATES WHETHER A TRIPWIRE 0 OR TRIPWIRE 1 INSTRUCTION CAUSED THE TRIPWIRE VALUE TO BE GENERATED. |
| TRIPWIRE DATA | 4 | TRIPWIRE DATA (4-BITS) |
| COLLISION BIT | 1 | INDICATES THAT MORE THAN ONE PICOENGINE HAS OUTPUT A TRIPWIRE VALUE AT THE SAME TIME. |

TRIPWIRE VALUE TABLE

NETWORK DEVICE WITH A DEBUG INTERFACE

IBNFP INTEGRATED CIRCUIT

CONFIGURABLE MESH EVENT BUS

PERSPECTIVE VIEW OF LOCAL EVENT RING THAT PASSES THROUGH THE INGRESS NBI ISLAND

EVENT RING CIRCUIT

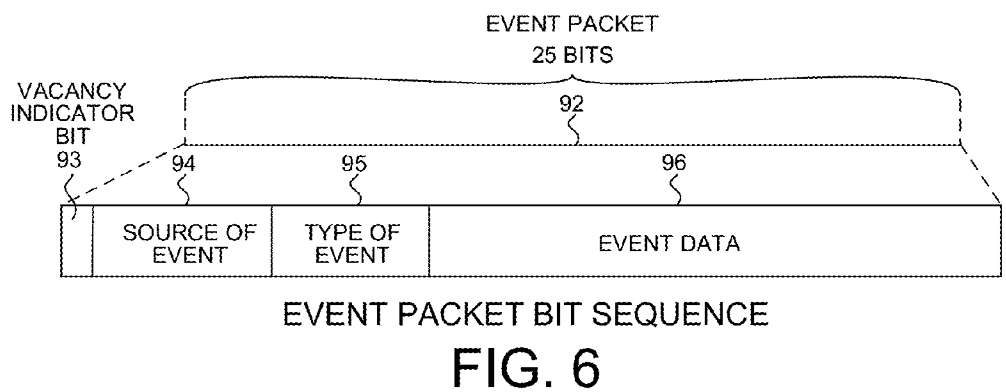

EVENT PACKET BIT SEQUENCE

FIG. 6

| FIELD | WIDTH | DESCRIPTION |
|---|---|---|
| VACANCY INDICATOR | 1 | REFERENCE BIT THAT INDICATES WHETHER THE SEGMENT ON THE LOCAL EVENT RING IS VACANT OR OCCUPIED. (0 = EVENT PACKET PRESENT, 1 = VACANT) |
| SOURCE OF EVENT | 8 | ADDRESS OF THE EVENT RING CIRCUIT THAT INSERTED THE EVENT PACKET INTO THE LOCAL EVENT RING. |
| TYPE OF EVENT | 4 | A FIELD THAT MAY INDICATE IF THE EVENT PACKET SHOULD BE INSERTED IN THE GLOBAL EVENT CHAIN. |
| EVENT DATA | 12 | INFORMATION REGARDING THE EVENT. |

EVENT PACKET TABLE

FIG. 7

PICOENGINE MULTI-PROCESSOR

PICOENGINE POOL

TRIPWIRE DATA MERGING AND COLLISION DETECTION CIRCUIT

MULTIPLE VALID BIT SET DETECTOR

SYMBOL OF THE 12x4:1 OR STRUCTURE

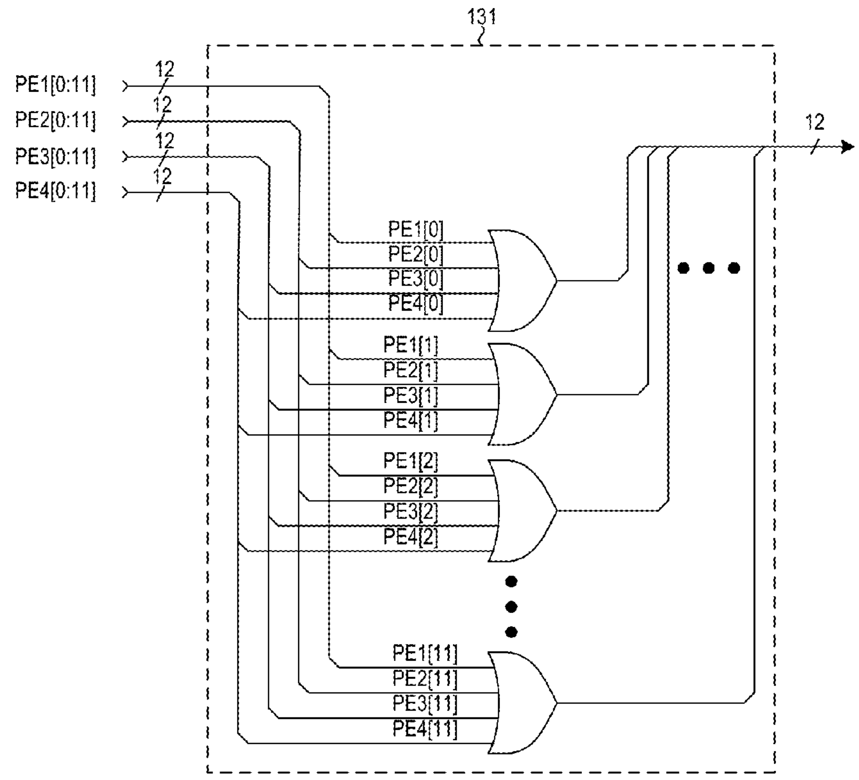

12x4:1 OR STRUCTURE

FIG. 14

| FIELD | WIDTH | DESCRIPTION |
|---|---|---|
| VALID BIT | 1 | VALID TRIPWIRE VALUE PRESENT ON THE TRIPWIRE BUS. |
| PICOENGINE NUMBER | 6 | HARDWIRED NUMBER THAT IDENTIFIES THE PICOENGINE THAT GENERATED THE TRIPWIRE DATA. |
| HIT BIT | 1 | INDICATES WHETHER A TRIPWIRE 0 OR TRIPWIRE 1 INSTRUCTION CAUSED THE TRIPWIRE VALUE TO BE GENERATED. |
| TRIPWIRE DATA | 4 | TRIPWIRE DATA (4-BITS) |
| COLLISION BIT | 1 | INDICATES THAT MORE THAN ONE PICOENGINE HAS OUTPUT A TRIPWIRE VALUE AT THE SAME TIME. |

TRIPWIRE VALUE TABLE

FIG. 15

PICOENGINE

STATE DIAGRAM OF THE CLOCK CONTROL AND PIPELINE CONTROL STATE MACHINE

MANY SMALL SECTIONS OF SPECIALIZED CODE

ONE SECTION OF CODE

OCTETS IN ONE 128-BIT BLOCK

FETCH INSTRUCTION WHERE THE OFFSET IS A VALUE IN THE INITIAL FETCH INFO

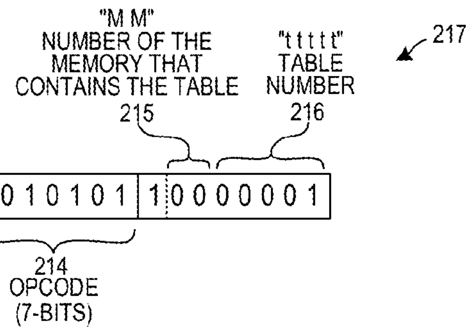

THE OFFSET INTO THE TABLE IS AN EIGHT-BIT PORTION OF THE INPUT DATA VALUE, WHERE THE NUMBER OF THE EIGHT-BIT PORTION IS GIVEN BY THE CURRENT VALUE OF THE PACKET POINTER

FETCH INSTRUCTION WHERE THE OFFSET IS A VALUE IN THE INPUT DATA VALUE

FIG. 22

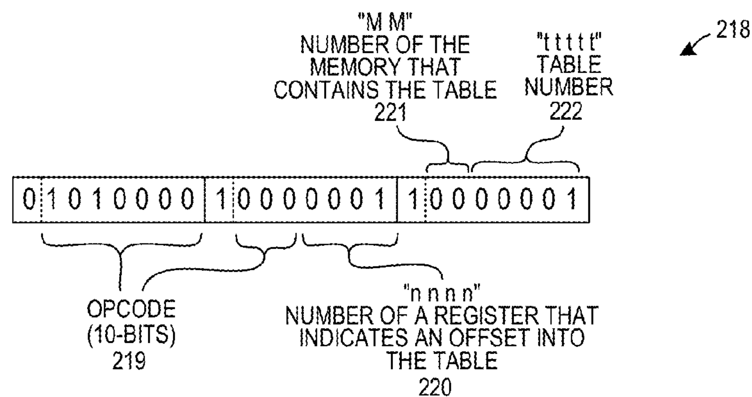

FETCH INSTRUCTION WHERE THE OFFSET IS IN A SPECIFIED REGISTER

FIG. 23

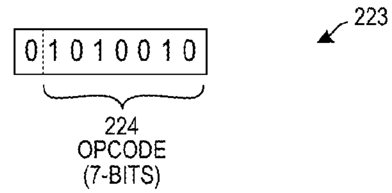

FETCH THE NEXT 128-BIT BLOCK OF INSTRUCTIONS AFTER THE LAST INSTRUCTION FETCHED. THE MEMORY IS THE SAME MEMORY FROM WHICH THE LAST INSTRUCTION WAS FETCHED.

FETCH MORE INSTRUCTION

FIG. 24

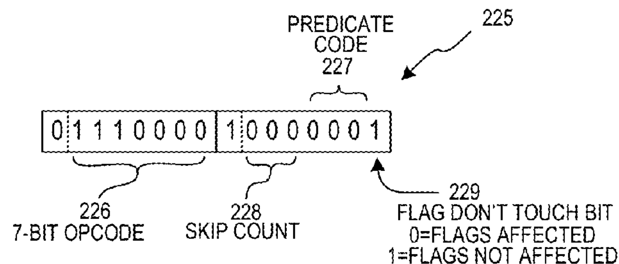

SKIP INSTRUCTION

FIG. 25

| P | P | P | DESCRIPTION |
|---|---|---|---|
| 0 | 0 | 0 | ZERO FLAG IS SET |
| 0 | 0 | 1 | ANY FLAG IS SET |
| 0 | 1 | 0 | CARRY FLAG IS SET AND ZERO FLAG IS CLEAR |
| 0 | 1 | 1 | ALWAYS |
| 1 | 0 | 0 | NOT (ZERO FLAG IS SET) |
| 1 | 0 | 1 | NOT (ANY FLAG IS SET) |
| 1 | 1 | 0 | NOT ( CARRY FLAG IS SET AND ZERO FLAG IS CLEAR) |
| 1 | 1 | 1 | NOT (ALWAYS) |

PREDICATE CODES INDICATED BY THE PREDICATE BITS

FIG. 26

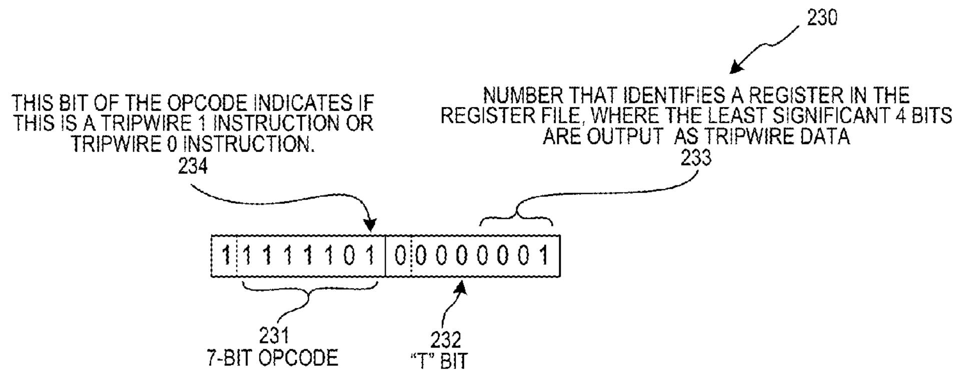

"T" BIT INDICATES WHETHER TO USE THE BOTTOM 4 BITS DIRECTLY ('IMMEDIATE') AS THE FOUR TRIPWIRE DATA BITS, OR WHETHER TO USE THOSE FOUR BITS AS A REGISTER NUMBER TO READ TO GET THE DATA THAT WILL BE THE FOUR TRIPWIRE DATA BITS.

TRIPWIRE INSTRUCTION

FIG. 27

LOAD REGISTER FILE READ STAGE CONTROL REGISTER INSTRUCTION

EXECUTION OF THE FINISHED INSTRUCTION CAUSES THE FINISHED SIGNAL TO BE ASSERTED, THE CONTENTS OF THE REGISTER FILE TO BE OUTPUT FROM THE PROCESSOR AS THE "OUTPUT DATA", AND THE PROCESSOR TO STOP CLOCKING.

FINISHED INSTRUCTION

TABLE NUMBER TO BASE ADDRESS
LOOKUP TABLE CIRCUIT

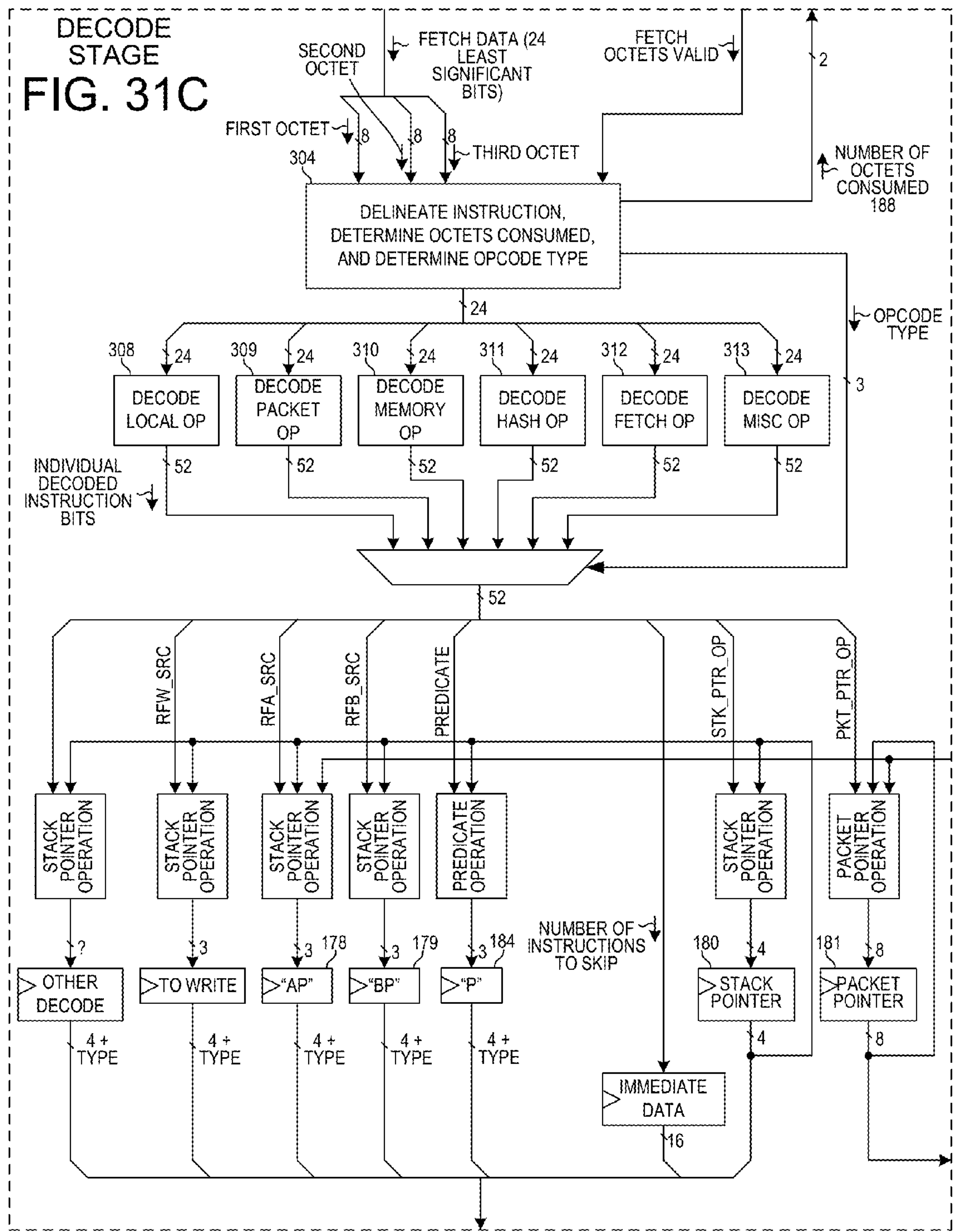

DECODE STAGE
FIG. 31C
SECOND OCTET
FETCH DATA (24 LEAST SIGNIFICANT BITS)
FETCH OCTETS VALID
2
FIRST OCTET
8
8
8
THIRD OCTET
304
NUMBER OF OCTETS CONSUMED 188
DELINEATE INSTRUCTION, DETERMINE OCTETS CONSUMED, AND DETERMINE OPCODE TYPE
24
OPCODE TYPE
308
309
310
311
312
313
DECODE LOCAL OP
DECODE PACKET OP
DECODE MEMORY OP
DECODE HASH OP
DECODE FETCH OP
DECODE MISC OP
3
52
INDIVIDUAL DECODED INSTRUCTION BITS
RFW_SRC
RFA_SRC
RFB_SRC
PREDICATE
STK_PTR_OP
PKT_PTR_OP
STACK POINTER OPERATION
PREDICATE OPERATION
PACKET POINTER OPERATION
NUMBER OF INSTRUCTIONS TO SKIP
178
179
184
180
181
OTHER DECODE
TO WRITE
"AP"
"BP"
"P"
STACK POINTER
PACKET POINTER
4 + TYPE
IMMEDIATE DATA
16

SHIFT DOWN BY AND ADD NO-OP CIRCUIT

MULTI-PROCESSOR SYSTEM HAVING TRIPWIRE DATA MERGING AND COLLISION DETECTION

TECHNICAL FIELD

The described embodiments relate generally to a processor that executes a tripwire instruction, and to a tripwire data merging and collision detection circuit that communicates tripwire values from a pool of such processors onto a single consolidated tripwire bus for subsequent communication out of an integrated circuit to a debug station, and to related structures and methods.

REFERENCE TO ASCII TEXT FILE APPENDIX

This application includes an ASCII text file appendix containing source code to software that embodies the inventions described herein. The software code is a hardware description language header file for one embodiment of the picoengine. The header file describes the contents of control buses and control signals within the picoengine. The hardware description language is CDL. The source code is in ASCII format. A portion of the disclosure of this patent document contains material that is subject to copyright protection. All the material on the ASCII text file appendix is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights. The ASCII text file appendix includes one text file readable in the MS-Windows operating system. The file is named "Picoengine_Header_File_Code.txt", is 12.1 kilobytes large, and was created on May 31, 2012.

SUMMARY

Due to its novel architecture, a pipelined run-to-completion processor is implemented in one embodiment in about ten thousand equivalent gates. The processor is therefore very small and is also referred to as a "picoengine". The picoengine has no instruction counter and only fetches instructions either: as a result of being prompted from the outside by an incoming input data value and/or an incoming initial fetch information value, or as a result of execution of a fetch instruction. Due to the lack of an instruction counter and the associated control circuitry which can be substantial, the picoengine can be realized in a small amount of integrated circuit area. The picoengine includes a pipeline, and the pipeline includes a fetch stage, a fetch shift selector stage, a decode stage, a register file read stage, and an execute stage. The picoengine has an input data port through which the picoengine receives data to be processed. This input data may, for example, involve network packet data. The picoengine also has an output data port, onto which the picoengine outputs processed data. The processed data may, for example, involve processed network packet data. The picoengine does not fetch instructions through either of these two ports. The picoengine also has a memory interface port. The picoengine uses is memory interface port to fetch instructions from a local memory. The picoengine also does not have the capability and circuitry to write anything into the local memory from which the picoengine fetches instructions, and the memory interface port is not usable to write data into any memory. This allows the picoengine to be made even smaller. In addition to the input data port, the output data port, and the memory interface port, the picoengine also has a novel tripwire bus port.

In a first novel aspect, the picoengine fetches and executes a novel tripwire instruction. Execution of the tripwire instruction causes the picoengine to output both a first multi-bit value and a second multi-bit value onto the tripwire bus port. The first and second multi-bit values are output onto the tripwire bus port for one and only one clock cycle when the instruction operation of the tripwire instruction is being performed by the execute stage. The first multi-bit value is data that is output from registers, and/or flags, and/or pointers, and/or data values stored in the pipeline. In one example of the tripwire instruction, the tripwire instruction contains a field, the content of which specifies what particular stored values of the pipeline will be output onto the tripwire bus port as the first multi-bit value. The second multi-bit value is a picoengine number. The picoengine number is a number that identifies the particular picoengine that executed the tripwire instruction. In one example, there are forty-eight identical picoengines in a pool, and the picoengine number is a number from one to forty-eight that is hardwired into the picoengine. The picoengine number uniquely identifies one of the picoengines of the pool, as distinguished from the other picoengines of the pool.

If the picoengine is not driving a valid tripwire value onto the tripwire bus port, then the conductors of the tripwire bus port that would otherwise be carrying the first and second multi-bit values are all driven with the same digital logic value (for example, a digital logic value of "0"). The tripwire bus port is not a registered I/O port. No address is decoded in the picoengine into order to clock the tripwire value into a particular I/O register of the picoengine. To the contrary, the tripwire value is only present on the tripwire bus port during one clock cycle during a time when the tripwire instruction is being executed.

In one example, there are two types of tripwire instructions. The opcodes of the two types of instructions differ from each other by one bit. In addition to the first and second multi-bit values, a tripwire value includes a single "hit bit" where the value of this single bit indicates whether the tripwire value was generated as a result of executing the first type of tripwire instruction or whether the tripwire value was generated as a result of executing the second type of tripwire instruction.

In a second novel aspect, each picoengine of a pool of identical picoengines has a tripwire bus port. Each respective one of the tripwire bus ports of the picoengines of the pool is coupled to a corresponding respective one of a plurality of tripwire bus inputs of a novel Tripwire Data Merging and Collision Detection Circuit (TDMCDC). The TDMCDC receives tripwire values from the picoengines and communicates the tripwire values from the various picoengines through the TDMCDC to and onto a common consolidated tripwire bus. The picoengine pool and TDMCDC is a part of an Island-Based Network Flow Processor (IB-NFP) integrated circuit. The IB-NFP integrated circuit has Debug Interface Circuitry and Input/Output Terminals (DICIOT) functionality. The tripwire values are communicated from the consolidated tripwire bus at the output of the TDMCDC and across the integrated circuit to the DICIOT, and then through the DICIOT and out of the integrated circuit, through a JTAG-to-USB interface cable, and to an external debug station. The debug station is usable by a user to receive tripwire values from picoengines within the integrated circuit and to monitor and debug software executing on the picoengines, where this software is made to include one or more of the novel tripwire instructions. The tripwire instructions are placed in the picoengine software at strategic locations. The picoengines of the pool output their tripwire values synchronously with respect to a common clock signal that clocks the pipelines of all the picoengines. If more than one picoengine outputs a valid tripwire value during a given clock cycle of this common clock signal, then the TDMCDC detects this collision condition and asserts a collision bit signal. The TDMCDC outputs the collision bit signal along with the first and second multi-bit values of the tripwire value supplied onto the consolidated tripwire bus. The digital logic value of the collision bit signal indicates whether there was a collision of two or more tripwire values within the TDMCDC.

All the tripwire instructions embedded in the software of a particular picoengine can be disabled in unison at one time by changing the digital logic value stored in a single "TE enable/disable" bit in the picoengine. The only function of the TE enable/disable bit is to provide an ability, through software, to enable and disable tripwire instructions. If the tripwire instructions are disabled in this way, then each tripwire instruction is decoded in the decode stage of the picoengine in normal course, but the instruction operation of the tripwire instruction is disabled so that no valid tripwire value is output onto the picoengine tripwire bus port as a result of execution of the tripwire instruction. In addition, the picoengine has a novel "load register file read stage control register" instruction (also referred to as the "load RF CSR" instruction) that is usable to set or clear this TE enable/disable bit, where execution of the "load register file read stage control register" instruction causes the setting or clearing of the TE enable/disable bit to occur one clock cycle prior to the clock cycle during which the execute stage would ordinarily carry out the instruction operation of the instruction.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is diagram that illustrates the bits and fields in an event packet.

FIG. 7 is table that describes the various fields in the event packet of FIG. 6.

FIG. 14 is a circuit diagram of the 12×4:1 OR structure of FIG. 13.

FIG. 15 is a table that sets forth the various fields of a tripwire value, in one specific example of a tripwire value.

FIG. 22 is a diagram of a fetch instruction, where the offset is a value in the input data value.

FIG. 23 is a diagram of a fetch instruction, where the offset is in a specific register of the register file.

FIG. 24 is a diagram of the fetch more instruction.

FIG. 25 is a diagram of a two-octet skip instruction.

FIG. 26 is a table of the predicate codes that are used to determined predicate conditions of conditional instructions.

FIG. 27 is a diagram of a novel two-octet tripwire instruction.

FIG. 31 is a diagram of a specific example of the pipeline of the picoengine of FIG. 16.

FIG. 31C is a diagram of a part of a larger diagram of FIG. 31.

DETAILED DESCRIPTION

Reference will now be made in detail to background examples and some embodiments of the invention, examples of which are illustrated in the accompanying drawings.

Figure 1:
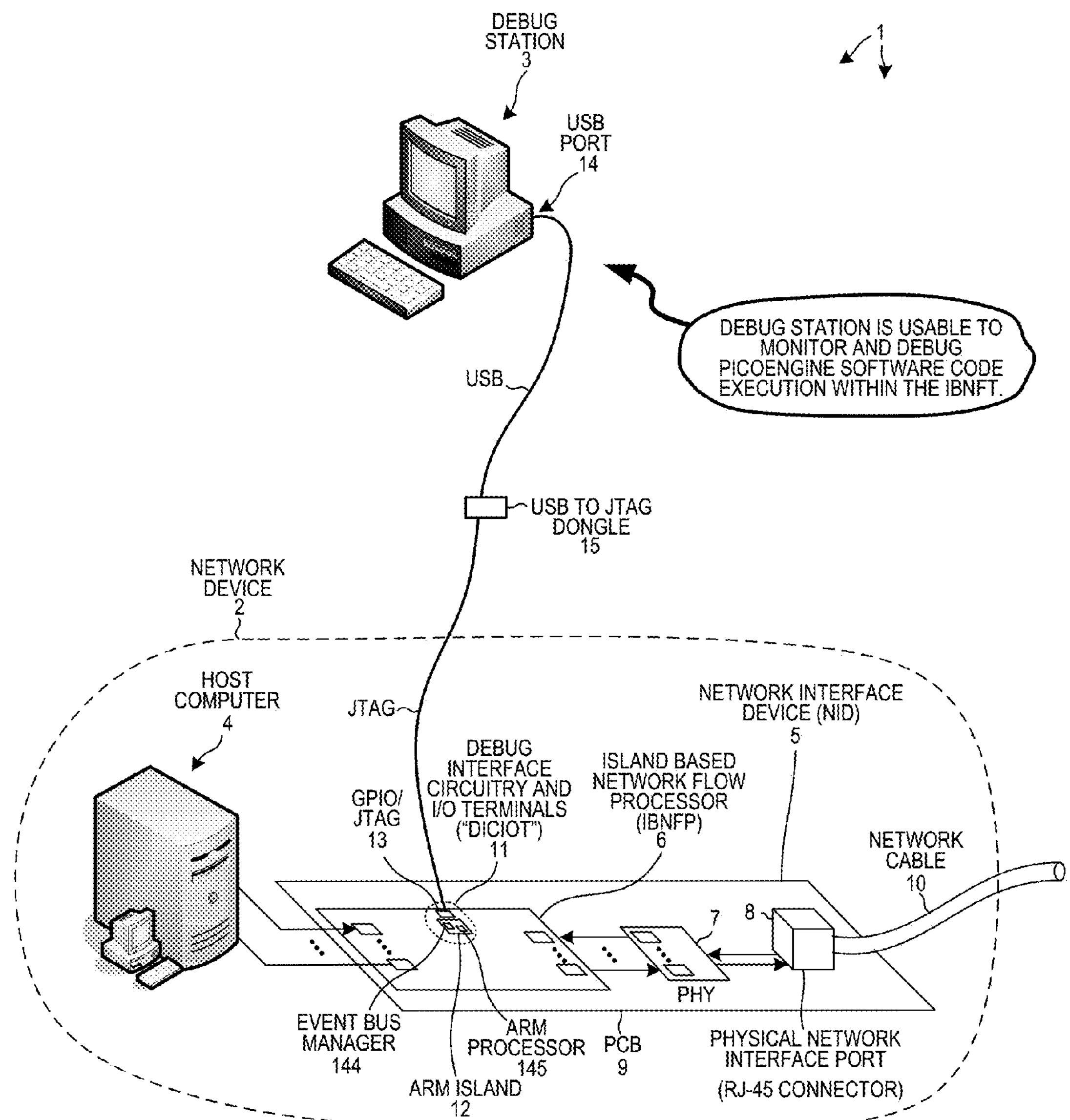
FIG. 1 is a diagram of system involving a network device and a debug station, where the debug station is usable to receive tripwire values output by picoengines within the network device in accordance with one novel aspect.

FIG. 1 is a diagram of a system 1 involving a network device 2 and a debug station 3. The network device 2 in this particular case includes a host computer 4 and an associated Network Interface Device (NID) 5. The network device may, for example, be a web server. The NID 5 is typically an expansion card that fits into a housing of the host computer and couples via PCIe bus connections to the motherboard of the host computer 4. The NID 5 includes, among other parts not shown, an Island-Based Network Flow Processor (IB-NFP) integrated circuit 6, a PHY transceiver integrated circuit 7, and a physical layer interface port 8 (for example, an RJ-45 connector). These components are disposed on a printed circuit board 9. Packets are received from a network onto the network device 2 via network cable 10. These packets pass through the physical network interface port 8, through the PHY 7, and into the IB-NFP 6 where they are processed. Packets also pass in the other direction from the IB-NFP 6, through the PHY 7, through the physical network interface port 8, and to the network via the network cable 10. In one example, the host computer 4 controls the operation of the NID 2 and receives information carried by packets onto the NID 2, and outputs information to the NID 2 that is to be communicated to the network in the form of packets.

The debug station 3 is usable to debug programs of instructions being executed by small processors within the IB-NFP 6. These small processors are called picoengines (or "PEs"). As described in further detail below, the program executed by such a picoengine is made to include one or more novel tripwire instructions. If one of these tripwire instructions is then executed by a PE, then the PE outputs a tripwire value, and this tripwire value is communicated by novel Tripwire Data Merging and Collision Detection Circuitry (TDMCDC) from the PE, out of the IB-NFP 6, and to the debug station 3. The user uses the debug station 3 to monitor these incoming tripwire values, to debug the programs of instructions, and to monitor operation of the IB-NFP 6. Each tripwire value received onto the debug station includes a picoengine number that indicates which particular PE it was that executed the tripwire instruction that resulted in the tripwire value being output from the IB-NFP 6. The tripwire value also includes a tripwire data value. The tripwire data may, for example, be the contents of a specified register within the PE, or the contents of certain flags within the PE, and/or other information as specified by the tripwire instruction.

To facilitate communication with the debug station 3, the IB-NFP 6 includes Debug Interface Circuitry and Input/Output Terminals (DICIOT) 11. The DICIOT 11 includes an event bus manager circuit 144, an ARM processor 145, as well as general purpose input/output circuitry and terminals 13. The event manager circuit 144 and the ARM processor 145 are parts of an ARM island 12 of the IB-NFP 6. The general purpose input/output circuitry and terminals 13 are part of a GPIO interface block 44 of the IB-NFP 6. The DICIOT 11 receives tripwire values via its event bus manager circuit 144 and communicates with circuitry outside the IB-NFP 6 using standardized JTAG (Joint Test Action Group) signals TMS, TCK, TDI and TDO. The debug station 3, however, does not have a JTAG port but rather uses a (Universal Serial Bus) USB port 14 for communication. A USB-to-JTAG dongle 15 and cable is therefore provided to provide signal interfacing between the JTAG debug port of the IBNP 6 and the USB port 14 of the debug station 3.

Figure 2:
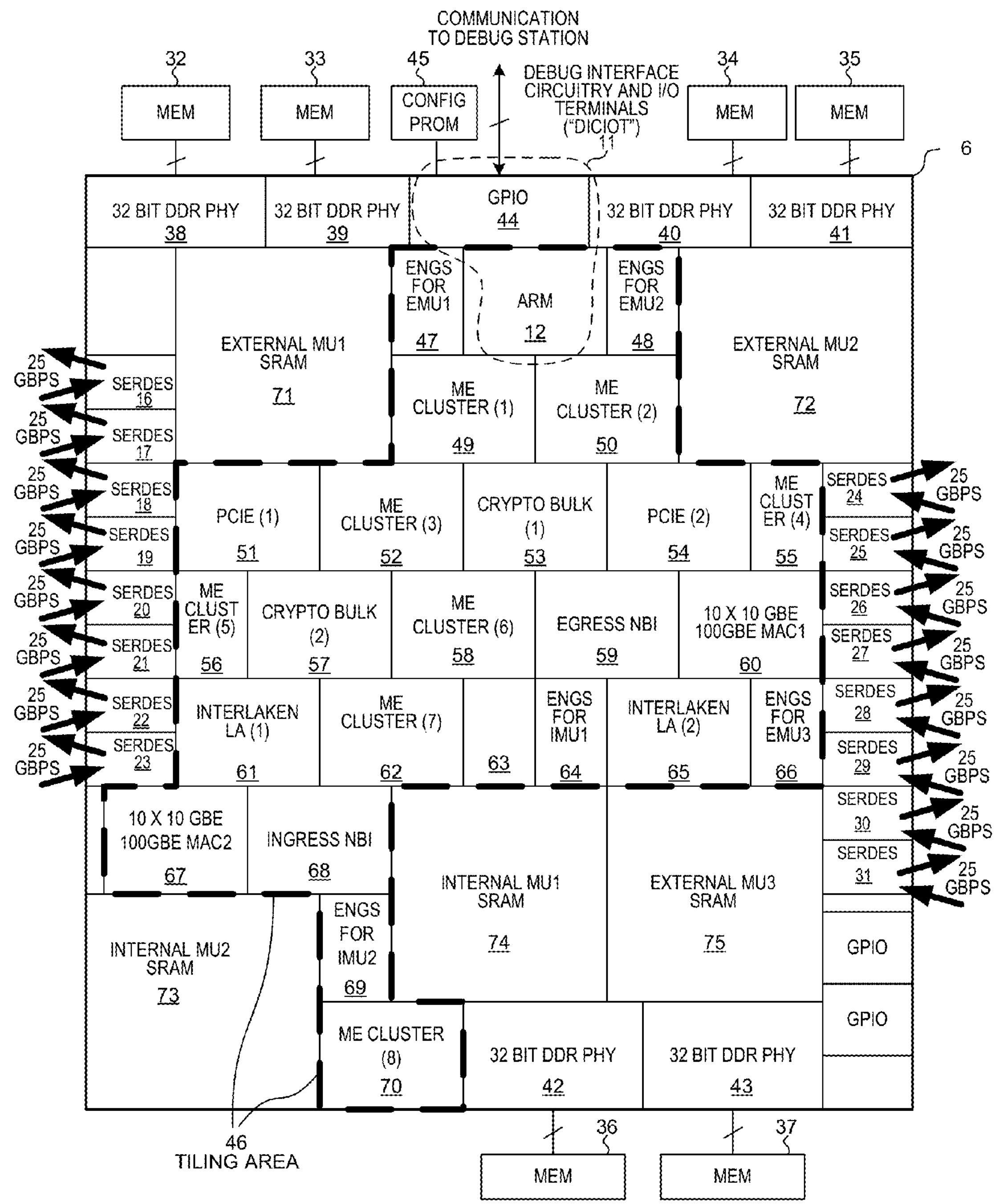
FIG. 2 is a top-down diagram of the island structure of the Island-Based Network Flow Processor (IB-NFP) integrated circuit within the network device of FIG. 1.

FIG. 2 is a simplified top-down diagram of the IB-NFP 6 of FIG. 1. IB-NFP integrated circuit 6 includes many I/O (input/output) terminals (not shown) that are typically disposed around the periphery of the integrated circuit. Each of these terminals couples to an associated terminal of an integrated circuit package (not shown) that houses the IB-NFP integrated circuit. The integrated circuit terminals may be flip-chip microbumps and are not illustrated. Alternatively, the integrated circuit terminals may be wire bond pads. The blocks 16-31 illustrated in FIG. 2 are SerDes circuits that are usable to communicate with external circuitry. Each of these SerDes circuits is duplex in that it has a SerDes connection for receiving information from the external circuit and it also has a SerDes connection for transmitting information to the external circuit. Each of these SerDes circuits can communicate packet data in both directions simultaneously at a sustained rate of 25 Gbps. In addition to SerDes input/output circuitry, the IB-NFP integrated circuit 6 also has 32-bit DDR physical interfaces 38-43 that are usable for accessing external memory integrated circuits 32-37. IB-NFP 6 also has several general purpose input/output (GPIO) interface blocks. A part of one of these GPIO interface blocks 44 is used to access an external PROM 45. Another part of the GPIO interface block 44 is used to communicate with the USB-to-JTAG dongle 15.

In addition to the area of the input/output circuits outlined above, the IB-NFP integrated circuit 6 also includes two additional areas. The first additional area is a tiling area 46 of islands. These islands are identified with reference numerals 12 and 47-70. Each of the islands is either of a full rectangular shape, or is half the size of the full rectangular shape. For example, the island 51 labeled "PCIE (1)" is a full island. The island 56 below it labeled "ME CLUSTER (5)" is a half island. The functional circuits in the various islands of this tiling area 46 are interconnected by: 1) a configurable mesh CPP data bus, 2) a configurable mesh control bus, and 3) a configurable mesh event bus. Each such mesh bus extends over the two-dimensional space of islands with a regular grid or "mesh" pattern. For additional information on the configurable mesh CPP data bus, the configurable mesh control bus, and the configurable mesh event bus, see: U.S. patent application Ser. No. 13/399,324, entitled "Configurable Mesh Data Bus In An Island-Based Network Flow Processor", filed Feb. 17, 2012, by Gavin J. Stark (the entire subject matter of which is incorporated herein by reference). Operation and structure of the event bus mesh is also described in further detail below.

In addition to tiling area 46, the IB-NFP integrated circuit 6 also has a second additional area of larger sized blocks 71-75. The functional circuitry of each of these blocks is not laid out to consist of islands and half-islands in the way that the circuitry of tiling area 46 is laid out. The mesh bus structures do not extend into or over any of these larger blocks. The mesh bus structures do not extend outside of tiling area 46. As an exception to interconnecting the function circuitry of island using configurable mesh bus structures, the functional circuitry of a larger sized block disposed outside the tiling area 46 may be connected by direct dedicated hardwired connections to an interface island within tiling area 46 and through the interface island achieve connectivity to the mesh buses and other islands.

Figure 3:
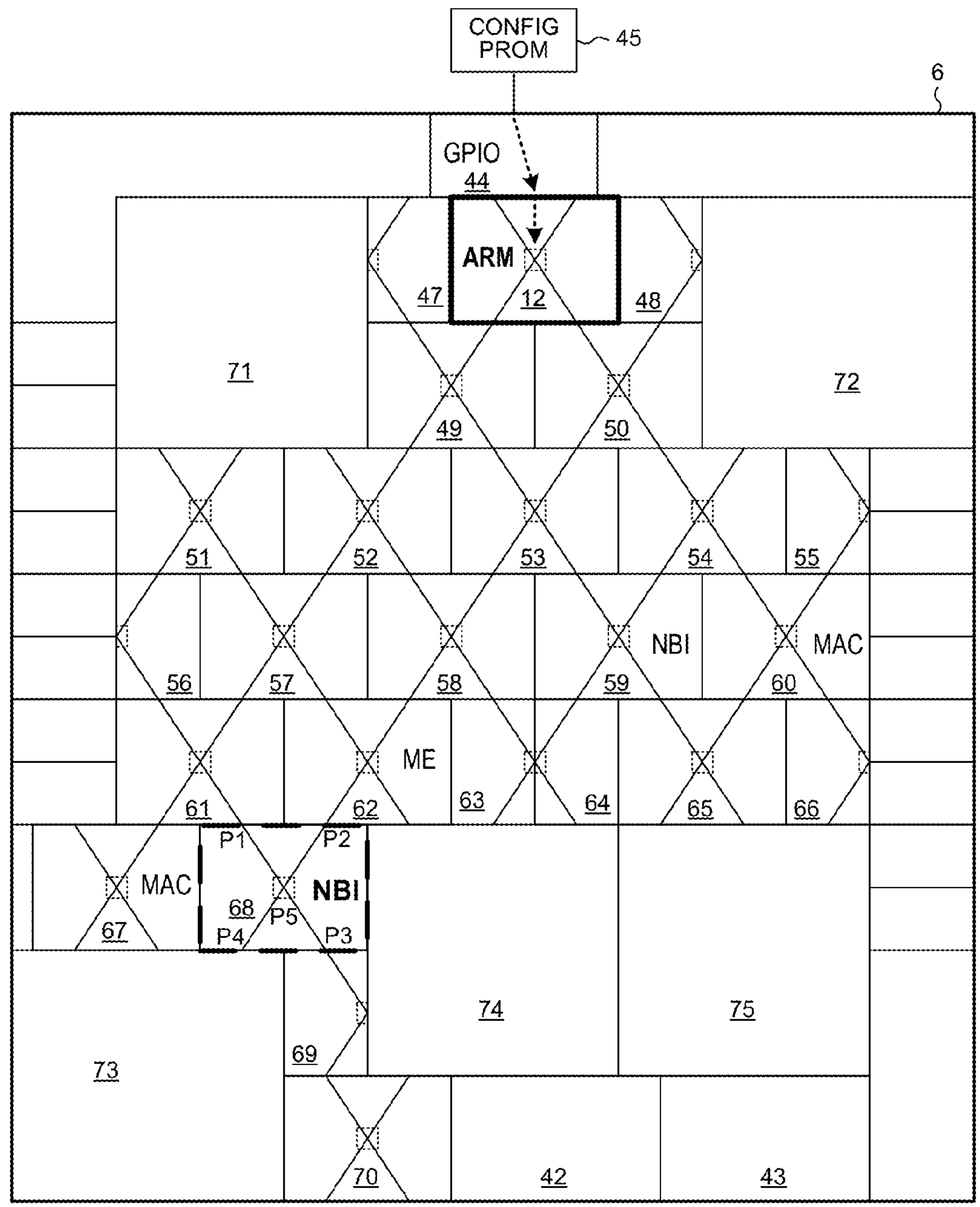
FIG. 3 is a diagram the configurable mesh event bus within the IB-NFP of FIG. 2.

FIG. 3 is a top-down diagram of the block structure of the IB-NFP 6, showing the configurable mesh event bus structure disposed over the tiling area 46. In the event mesh bus overlay, each full island has four half links. Each half link extends between a Real Time Configurable Switch (RTCS) functional circuit that is centrally located within the island and one of four port locations at the periphery of the island. For example, these four ports of the ingress NBI island 68 of FIG. 3 are denoted P1, P2, P3 and P4. Each of these half link is bidirectional. In addition, each full island also has a bidirectional half link that extends from the centrally located RTCS to functional circuitry within the island. In FIG. 3, the port associated with this half link is denoted P5.

By configuring the RTCS functional circuits of the various islands, the links of the configurable mesh event bus structure can be configured so that the links are coupled from end-to-end, one to the next, so that a resulting event bus extends from island, to island, to island, in what is called a ring or a chain. As an event bus ring or chain passes through an island, the event bus can be structured so that it extends from the mesh overlay, through the RTCS, then through one or more event ring circuits in an amount of the functional circuitry of the island, then back to the RTCS, then through the mesh overlay and to the next island. For additional information on the configurable mesh event bus and how it can be configured to form one or more event rings and chains, see: 1) U.S. patent application Ser. No. 13/399,678, entitled "Local Event Ring In An Island-Based Network Flow Processor", filed Feb. 17, 2012, by Gavin J. Stark; and 2) U.S. patent application Ser. No. 13/399,983, entitled "Global Event Chain In An Island-Based Network Flow Processor", filed Feb. 17, 2012, by Gavin J. Stark (the entire contents of both of these applications is incorporated herein by reference).

Figure 4:
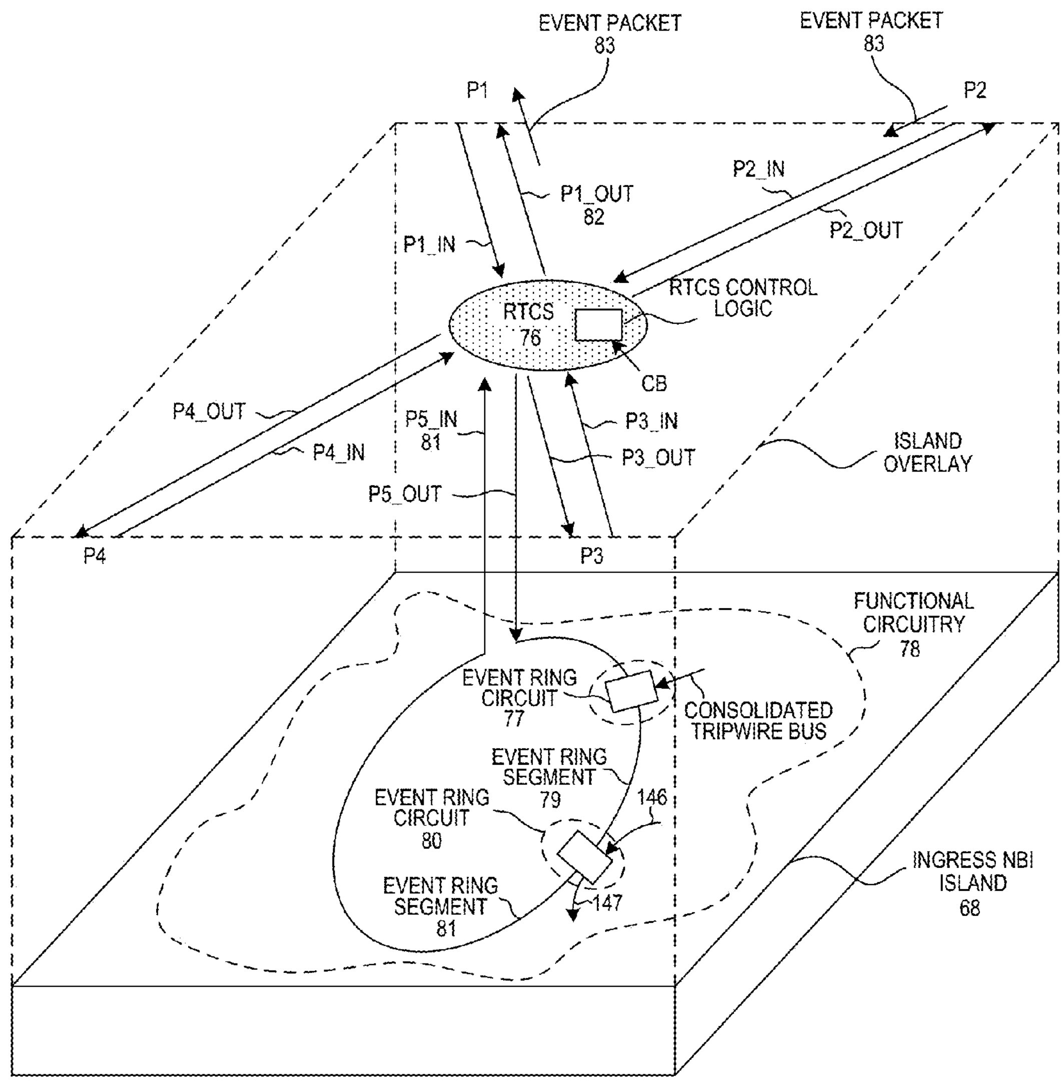
FIG. 4 is a simplified perspective diagram of showing a portion of the configurable mesh event bus that extends over the ingress NBI island of the IB-NFP of FIG. 2.

FIG. 4 is a perspective view of Ingress NBI island 68 and the part of the configurable mesh event bus structure of that NBI island 68. The RTCS control logic circuits of the configurable mesh event bus structure of the entire IB-NFP 6 are configured (via the configurable mesh control bus CB) so that the configurable mesh event bus structure forms an event ring that extends from another island, then into the NBI island 68 via half link portion P2_IN, and then through the RTCS 76, and then through half link portion P5_OUT to event ring circuit 77 in the functional circuitry 78 of the Ingress NBI island. The event ring then extends from event ring circuit 77, through event ring segment 79, to event ring circuit 80, through event ring circuit 80, and back to the RTCS 76 via half link portion P5_OUT 81 (event ring segment 81), through RTCS 76, and to another island via half link portion P1_OUT 82. Note that event ring circuit 80, if appropriately configured, can receive event packets from two incoming event ring segments, and can output event packets onto two outgoing event ring segments. This type of event ring circuit is usable to detect event packets of a given type that are traveling in one ring or chain, and to copy those selected event packets onto another event ring or chain. The event ring segments for such a second event ring or chain are identified by reference numerals 146 and 147 in FIG. 4.

There is a global clock signal that clocks all the event ring circuits. Although not shown in FIG. 3 and FIG. 4, there are multiple registers (referred to as "slots") disposed along each half link portion, and these registers are also all clocked by the same global clock signal. Information passes through the event chain serially in what are called "event packets". Due to the registering of the half link portions and due to the clocking of the overall event bus structure by the same global clock signal, an event packet 83 transitions along the event chain from register to register synchronously with the clocking of the global clock signal. Multiple event packets can be traveling through the event ring at a given time, provided that the event packets are traveling one behind the other and do not collide with one another.

Figure 5:
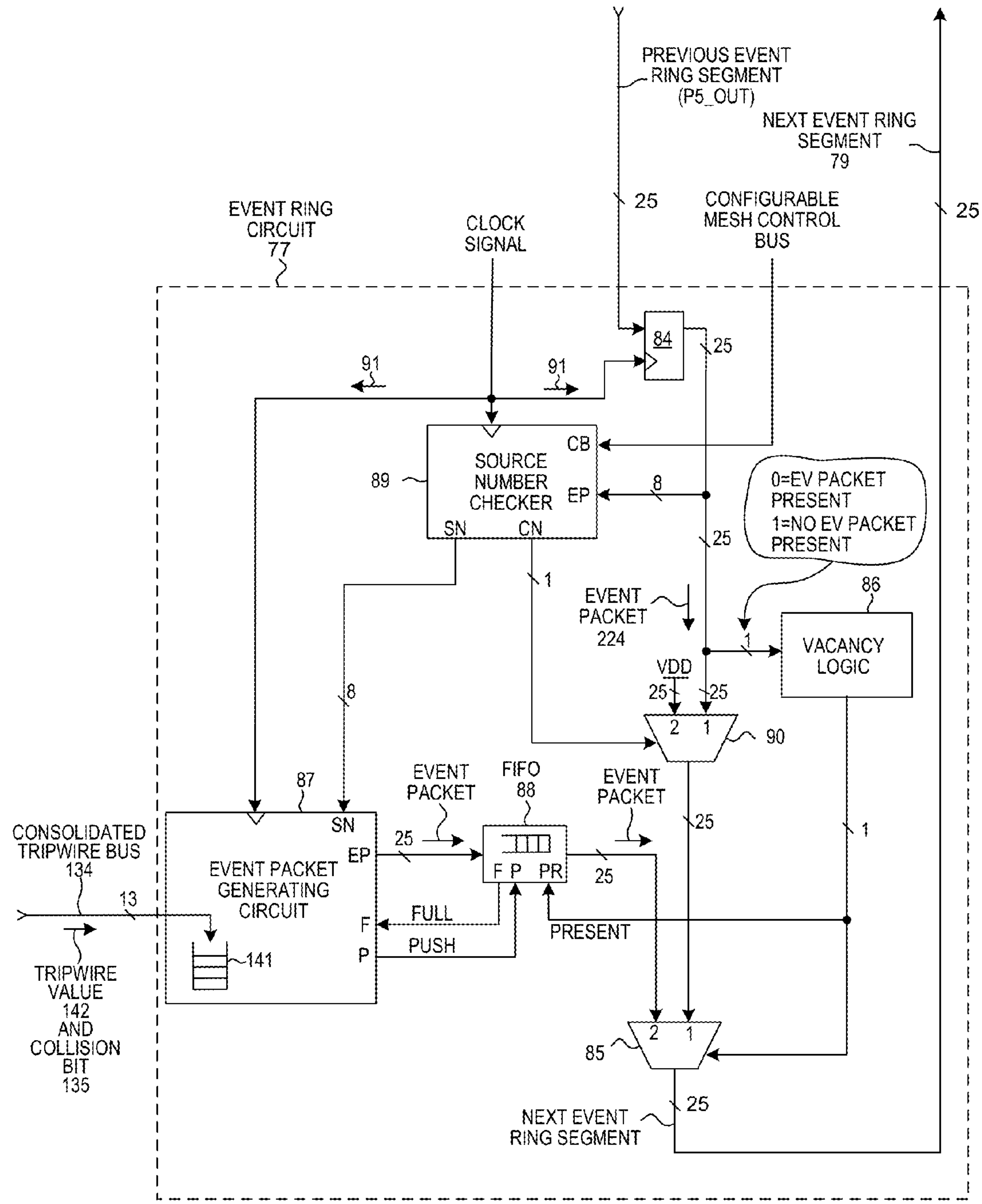
FIG. 5 is a diagram of an event ring circuit within the NBI island of FIG. 4.

FIG. 5 is an expanded diagram of event ring circuit 77 shown in FIG. 4. Event ring circuit 77 includes a register circuit 84, a multiplexer circuit 85, vacancy logic 86, an event packet generating circuit 87, a First In First Out circuit (FIFO) 88, a source number checker 89, and a multiplexer circuit 90. On a given clock cycle of the global clock signal 91, an event packet can be clocked into the event ring circuit 77 from previous event ring segment P5_OUT. If on a given clock cycle of the global clock signal 91 an event packet is not received into the register 84 of the event ring circuit from event ring segment P5_OUT, then the vacancy logic 86 detects this condition and causes the event generating circuit 87 and the FIFO 88 to inject an event packet onto the next event ring segment 79 via multiplexer 85. If, however, an event packet was received into the register circuit 84 from event ring segment P5_OUT, then the vacancy logic 86 determines that such an event packet has been received and it controls multiplexer circuit 85 to pass along the event packet to the next event ring segment 79 and will not inject a new event packet onto the event ring.

FIG. 6 is a diagram of an event packet 92. The event packet includes a vacancy indicator bit 93, a source of event field 94, a type of event field 95, and an event data field 96. Bit 93 and fields 94 and 95 together form a sort of header of the event packet. Event data field 96 is the payload of the event packet. FIG. 7 is table diagram of FIG. 6.

The source number checker 89 of the event ring circuit 77 of FIG. 5 checks the value of the "source of event" field of event packets coming into the event ring circuit from the previous event ring segment P5_OUT. If an incoming event packet is detected to have a "source of event" field value indicating that the event packet was originally sourced by the event ring circuit 77, then the event ring circuit 77 deletes/removes the event packet from the event ring. In FIG. 5, the source number checker 89 controls multiplexer circuit 90 to output the multiplexer's 25-bit VDD data input value onto the multiplexer's 25-bit output, thereby effectively deleting the event packet from the event ring.

The general flow of network information from the network of FIG. 1 into the IB-NFP 6 of FIG. 1 is as follows. Packet information is received from the network cable 10, through the connector 8, through the PHY 7, and then passes through SerDes I/O blocks of the IB-NFP 6, and into the ingress MAC island 67 across dedicated conductors. The symbols are converted into packets by a 100 Gbps Ethernet block within the MAC island 67. The 100 Gbps Ethernet block analyzes the symbols and places the results of this analysis at the beginning of the packet in the form of a "MAC prepend" value. The MAC prepend value includes: 1) an indication of the length of the packet, 2) an indication whether the packet in an IP packet, 3) an indication of whether the checksums are correct, and 4) a time stamp indicating when the packet was received. The resulting packets and associated MAC prepend values are then buffered in an SRAM in the MAC island 67. Packets that are buffered in the SRAM in the MAC island 67 are then output from the MAC island 67 to the ingress NBI island 68 in the form of one or more 256 byte "minipackets" communicated across dedicated connections 104.

Figure 8:
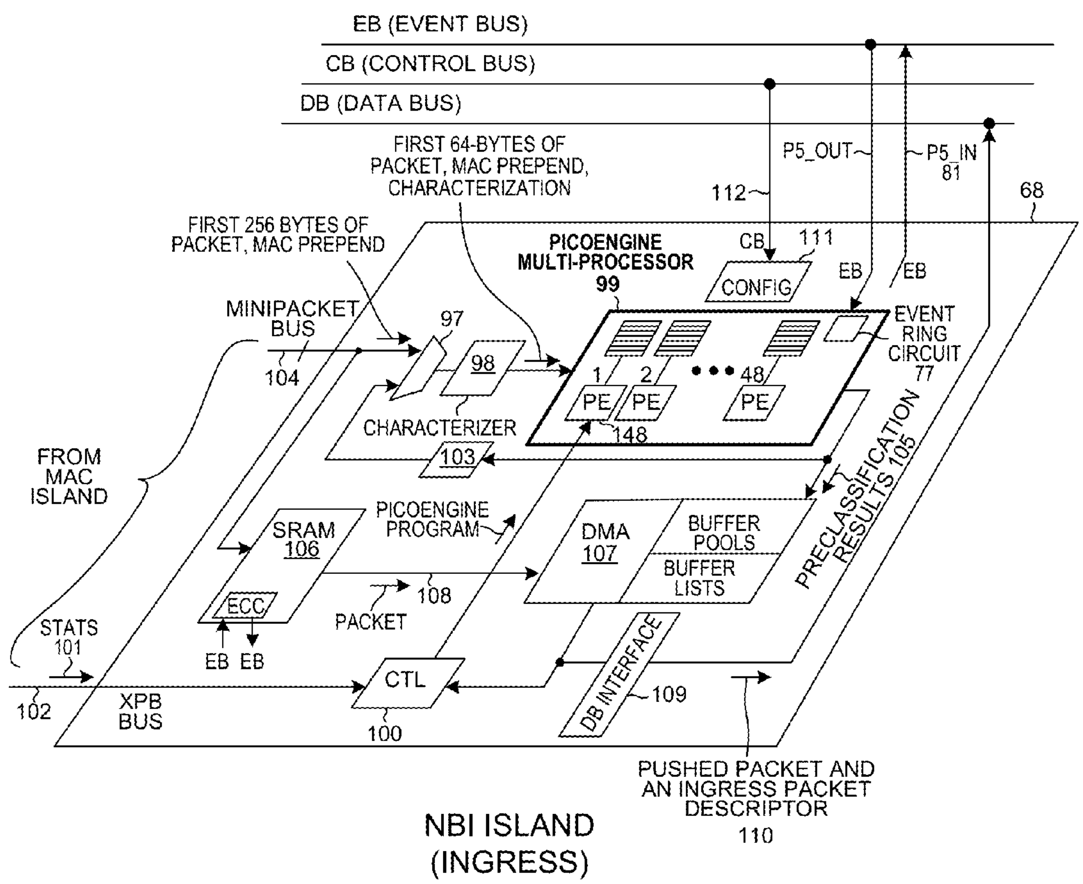
FIG. 8 is a simplified perspective diagram of the ingress NBI island of FIG. 4.

FIG. 8 is a diagram of NBI island 68. The ingress NBI island 68 receives the MAC prepend and the minipackets via the dedicated connections 104 from the ingress MAC island 67. The first 256 bytes of the packet and the MAC prepend pass through multiplexing circuitry 97 and to a characterizer 98. Characterizer 98 outputs characterization information, the first sixty-four bytes of the packet, and the MAC prepend. This is passed to a picoengine multi-processor 99 of forty-eight picoengines ("PEs"). Each picoengine executes a program stored in a memory in the picoengine multi-processor block 99. The program for each picoengine can be updated and changed under software control via control block 100. Control block 100 is also usable to receive the statistics information 101 from the MAC island 67 via XPB bus connections 102. To perform deeper and deeper analysis into the header structure of an incoming packet, the output of the picoengine multi-processor 99 can be passed back through a tunnel recirculation path and tunnel recirculation FIFO 103 to the characterizer 98 in an iterative fashion. Picoengine multi-processor 99 outputs "preclassification results" 105. The preclassification results for a packet include: 1) a determination of which one of multiple buffer pools to use to store the packet, 2) a sequence number for the packet in a particular flow of packets through the IB-NFP, and 3) user metadata. A "buffer pool" is a set of targets in ME islands where header portions can be placed. A "buffer list" is a list of memory addresses where payload portions can be placed. The user metadata is typically a code generated by the picoengines, where the code communicates certain information about the packet. In the present operational example, the user metadata includes a bit. If the bit is set then the packet was determined to be of a first type (an exception packet), whereas if the bit is not set then the packet was determined to be of a second type (a fast-path packet).

At this point, the entire packet is buffered in SRAM 106. DMA engine 107 can read the packet out of SRAM 106 via conductors 108, and then use the buffer pools to determine a destination to which the packet header is to be DMA transferred, and use the buffer lists to determine a destination to which the packet payload is to be DMA transferred. The DMA transfers occur across the configurable mesh CPP data bus. In the case of the exception packet of this example, the preclassification user metadata and buffer pool number indicate to the DMA engine 107 that the packet is an exception packet and this causes a first buffer pool and a first different buffer list to be used, whereas in the case of the fast-path packet the preclassification user metadata and buffer pool number indicate to the DMA engine 107 that the packet is a fast-path packet and this causes a second buffer pool and a second buffer list to be used. Block 109 is CPP data bus interface circuitry through which the CPP configurable mesh data bus is accessed. Arrow 110 represents a packet that is DMA transferred out of the NBI island 68 by DMA engine 107. Each such packet is output with a corresponding ingress packet descriptor. An ingress packet descriptor includes: 1) an address indicating where and in which ME island the header portion is stored, 2) an address indicating where and in which MU island the payload portion is stored, 3) how long the packet is, 4) a sequence number for the flow to which the packet belongs, 5) user metadata. The programs stored in the picoengine multi-processor block 99 that are executable by the picoengines can be changed multiple times a second as the network device 2 operates. Configuration block 111 receives configuration information from the control bus (CB) tree via connections 112 and supplies the configuration information to various ones of the sub-circuits of NBI island 68 that are configurable.

Further processing on the packet is then performed by a particular microengine ("ME") processor, where the particular ME was determined by the indication of the buffer pools in the preclassification results. The receiving ME in the appropriation ME island further processes the packet. In a very simplified description, information flow proceeds from the ME island, to egress NBI island 59, to egress MAC island 60, through certain ones of the SerDes I/O blocks, out of the IB-NFP, through PHY 7, through physical network interface port 8, and through network cable 10, to the network.

Figure 9:
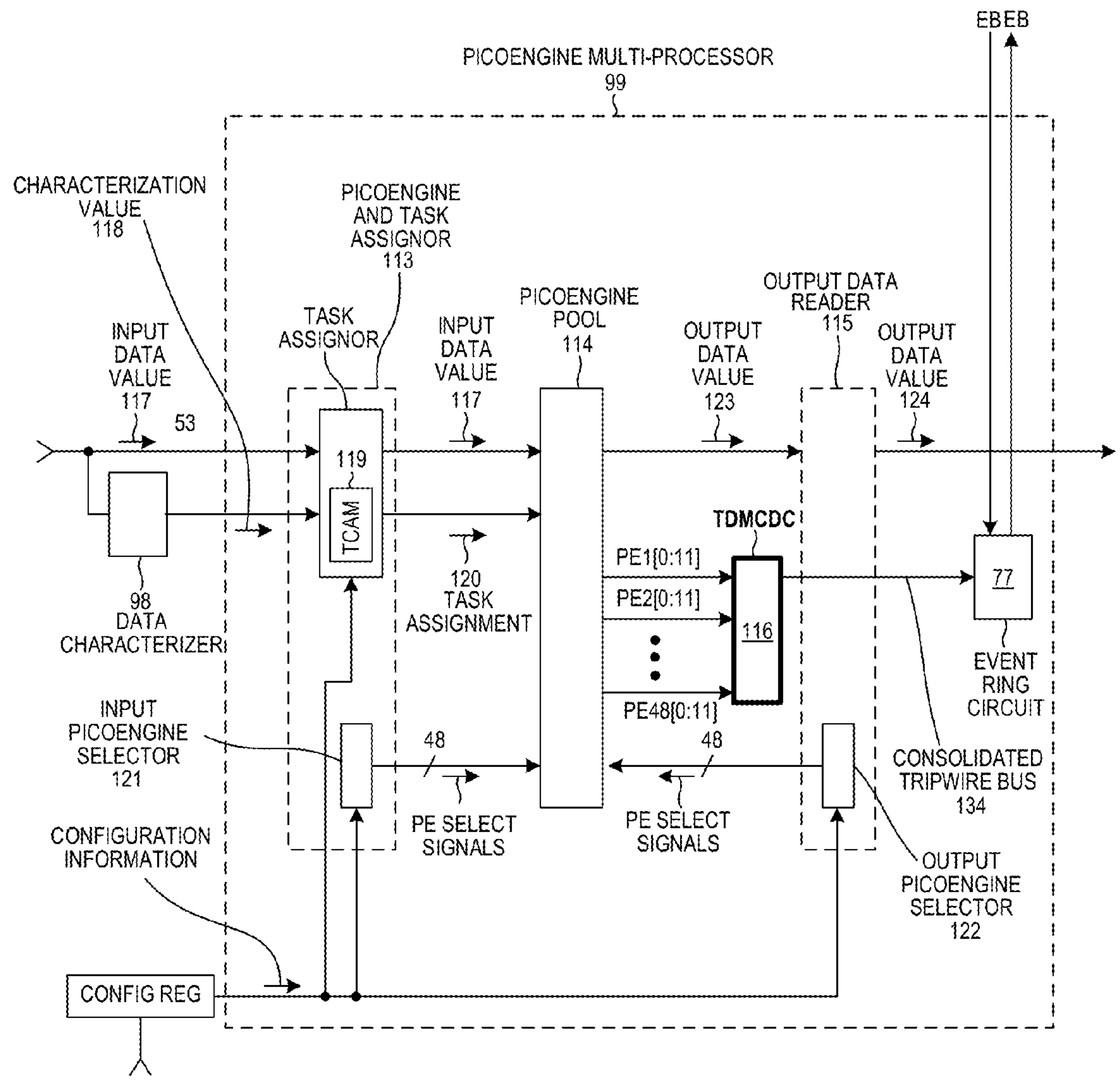
FIG. 9 is a diagram of a picoengine multi-processor within the ingress NBI island of FIG. 8.

FIG. 9 is a more detailed diagram of picoengine multi-processor 99 of FIG. 8. Picoengine multi-processor 99 includes, among other parts, a picoengine and task assignor 113, a picoengine pool 114, an output data reader 115, event ring circuit 77, and the novel Tripwire Data Merging and Collision Detection Circuit (TDMCDC) 116. The picoengine pool 114 is a pool of forty-eight picoengines, as well as a plurality of associated memories that contain programs that the picoengines can execute. The picoengines and memories are laid out across a surface of an integrated circuit with a particular hierarchical organization. In one example, each group of picoengines has access to separate local memory for the group. Groups of picoengines are in turn organized into clusters. Each cluster of picoengines has access to a corresponding one of two larger shared memories.

A stream of data input values is received on an input port of the picoengine multi-processor 99 as well as onto the data characterizer 98. An input data value 117 in this case is the first 256 bytes of packet and the MAC prepend received via dedicated connections 104 as described above in connection with FIG. 8. The input data value 117 is then characterized by the data characterizer, thereby generating a characterization value 118 associated with the input data value. The characterization value 118 includes a set of flags that indicate whether the input data value has certain characteristics. Typically, the data characterizer is an amount of high-speed combinatorial logic. From the various bits of the characterization value 118, a circuit 119 (for example, a TCAM) determines or looks up a task that should be done and generates a task assignment 120. The task indicated by the task assignment is therefore dependent on the characteristics of the input data value 117. An input picoengine selector 121 of the picoengine and task assignor 113 selects a next one of the plurality of picoengines in the picoengine pool. There are forty-eight conductor extending to the picoengines, and a PE select signal is supplied via one of these conductors to the desired picoengine. This selected picoengine, when it is ready and available to do processing, is made to receive the input data value 117 and the associated task assignment 120. The picoengine then begins performing the assigned task on the input data value as indicated by the task assignment. Performing the assigned task on the associated input data value may also, for example, involve using parts of the characterization value 118 in lieu of referring back to the original input data value 117, performing lookup operations locally or using a transactional memory resource, performing purely logical operations, performing counting operations, performing data logging or sorting operations, and performing arithmetic operations. In this sense the assigned task may be performed on the associated input data value by indirectly using other information related to the input data value.

Once the picoengine has been assigned the task, the next picoengine in the sequence is then supplied with the next input data value and a task assignment for that next input data value. In this way, the picoengine selector 121 selects picoengines one-by-one in a sequence, and each successively selected picoengine receives the next input data value of the stream along with an associated task assignment, where the task assignment for each input data value is generated based on the data of the input data value itself.

The output data reader 115 also includes a picoengine selector 122. The output picoengine selector 122 selects picoengines one-by-one in the very same sequence that the input picoengine selector 121 uses to select picoengines for task assignment purposes. If the next picoengine, as selected by the output picoengine selector, indicates that it has completed its assigned task and has generated an output data value 123, then the output value 123 from the selected picoengine is output from the picoengine multi-processor 99 as output data value 124. The output picoengine selector then selects the next picoengine in the sequence and waits for this next picoengine to indicate that it has data to output. Accordingly, the output picoengine selector 122 selects the picoengines in the same order that tasks were assigned to picoengines, so that when the next picoengine in the sequence has an output data value the output data value will be output from the picoengine multi-processor 99. From the high-level overall perspective of the picoengine multi-processor 99, the picoengine multi-processor receives a stream of input data values and outputs a stream of output data values. An output data value, as described in connection with FIG. 8, is the preclassification results 105 illustrated in FIG. 8. For additional information on a picoengine multi-processor, see: U.S. patent application Ser. No. 14/251,592, entitled "Picoengine Multi-Processor With Task Management", filed Apr. 12, 2014, by Gavin J. Stark (the subject matter of which is incorporated herein by reference).

Figure 10:
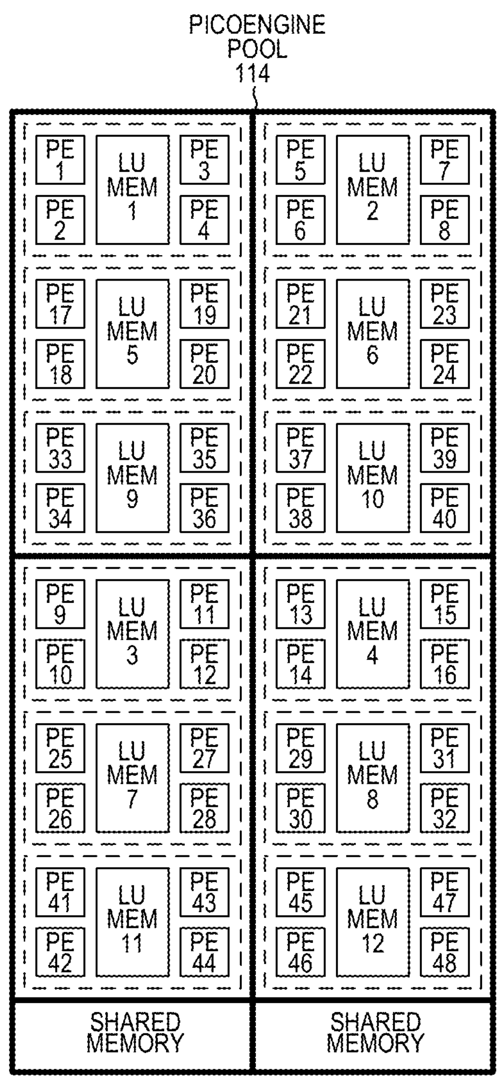
FIG. 10 is a simplified diagram of the pool of picoengines in the picoengine multi-processor of FIG. 9.

FIG. 10 is a diagram of the picoengine pool 114 of FIG. 9. The forty-eight picoengines are denoted PE1 through PE48 in the diagram. There are four picoengines in a group of picoengines. A group has an associated local memory that is accessible by the picoengines of the group. There are three groups in one cluster. There are four clusters in the picoengine pool. There are two shared memories. A picoengine of the left two clusters can access the left shared memory, and a picoengine of the right two clusters can accessed the right shared memory.

Figure 11:
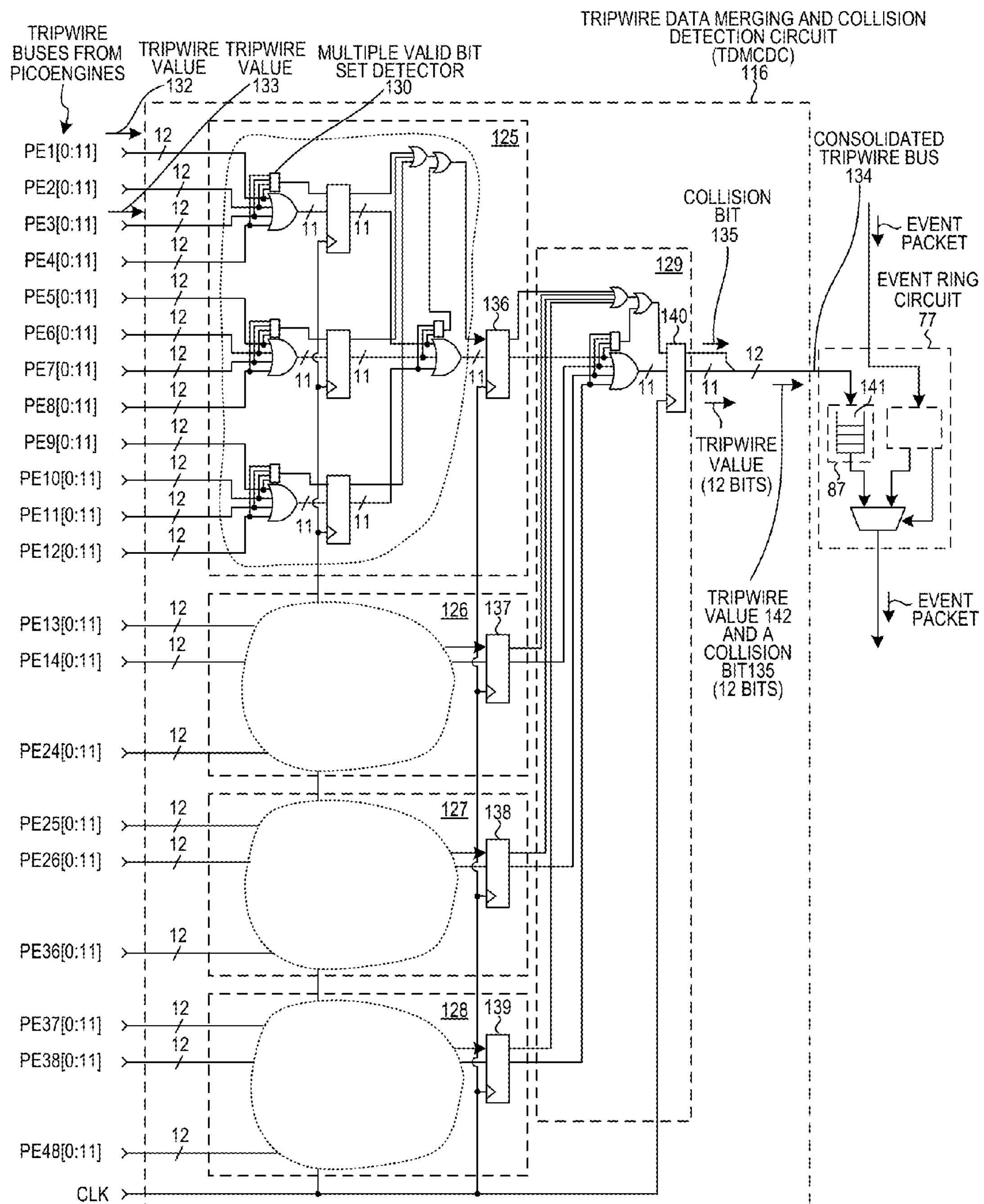
FIG. 11 is a diagram of the Tripwire Data Merging and Collision Detection Circuit (TDMCDC) in the picoengine multi-processor of FIG. 9.
Figure 12:
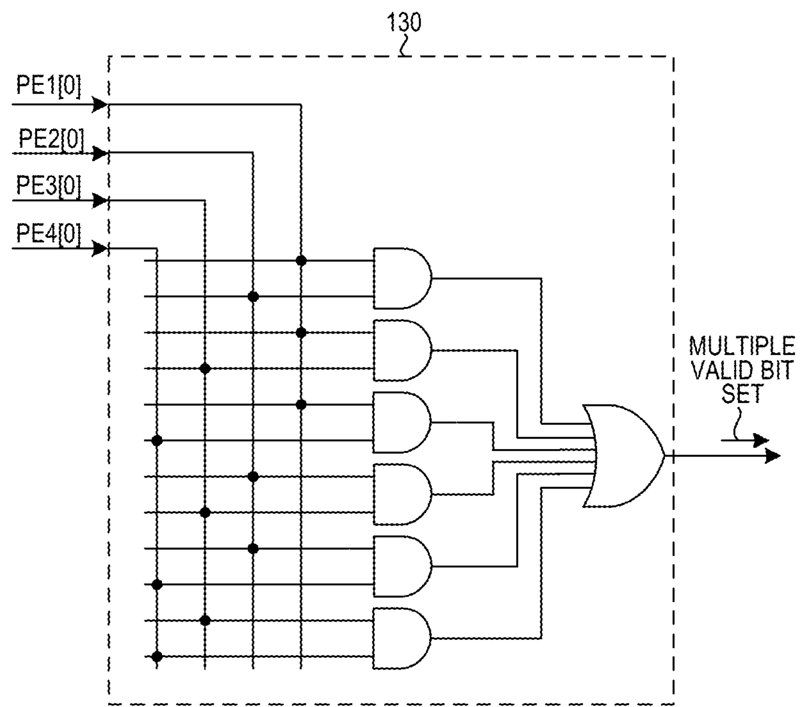
FIG. 12 is a diagram of a multiple valid bit set detector circuit in the TDMCDC of FIG. 11.
Figure 13:
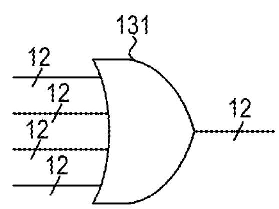
FIG. 13 is a symbol of the 12×4:1 OR structure in the TDMCDC of FIG. 11.

FIG. 11 is a more detailed is a more detailed diagram of the Tripwire Data Merging and Collision Detection Circuit (TDMCDC) 116 of FIG. 9. The TDMCDC 116 includes multiple logic blocks 125-129, four of which are identical. The logic circled in logic block 125 is represented in logic blocks 126-128 by empty circles. The logic blocks 125-129 include multiple "Multiple Valid Bit Set Detector" circuits, one of which is labeled in FIG. 11 by reference numeral 130. All these circuits are identical. FIG. 12 is a circuit diagram of one of these "Multiple Valid Bit Set Detector" circuits 130. Each of the AND gate symbols in FIG. 12 represents an ordinary two-input AND gate, and the six-input OR gate symbol in FIG. 12 represents an ordinary six-input OR gate. The "multiple valid bit set" signal output by the circuit of FIG. 12 is asserted if a collision is detected. There are OR gate circuit structure symbols in FIG. 11, each of which has four twelve-bit input buses and one twelve-bit output bus. This OR gate circuit structure is denoted as a 12×4:1 OR structure. FIG. 13 is a diagram of this symbol 131. This symbol 131 represents the circuitry shown in FIG. 14. The four-input OR gate symbols in FIG. 14 represent ordinary four-input OR gates. There are twelve such OR gates.

As shown in FIG. 9, the TDMCDC 116 is coupled to receive tripwire values from each of the forty-eight picoengines by a separate dedicated set of twelve conductors. A set of conductors is also referred to here as a "tripwire bus". The labels PE1[0:11] to PE48[0:11] designate the forty-eight sets of conductors that originate at the forty-eight picoengines. For example, as illustrated in FIG. 11, the first picoengine PE1 can send a tripwire value 132 to the TDMCDC 116 via the first set of dedicated conductors PE1[0:11]. Similarly, the third picoengine PE3 can send a tripwire value 133 to the TDMCDC 116 via the third set of dedicated conductors PE3[0:11]. If a picoengine is not supplying a tripwire value to the TDMCDC during a given clock cycle of the clock signal CLK, then the picoengine drives its set of conductor (its tripwire bus) so that all the signal lines carry "0" values. If none of the picoengines outputs a valid tripwire value during a given clock cycle of the clock signal CLK, then all of the tripwire buses PE1[0:11] to PE48[0:11] carry zero values. Eleven of the twelve zero values (the valid bit is routed to the valid bit set detector 130) pass through the stages of OR gates and registers of the TDMCDC and appear on the output set of conductors 134 (also referred to as the "consolidated tripwire bus" 134) as an eleven-bit tripwire value, all the bits of which are "0". The accompanying collision bit 135 is a digital "0", because there were not two valid tripwire values supplied by two picoengines at the same time (i.e., there was no collision). The consolidated tripwire bus 134 therefore has twelve conductors (twelve conductors for the 11-bit tripwire value, and one conductor for the collision bit). If, however, one and only one of the picoengines outputs a valid tripwire value during a given clock cycle of the clock signal CLK, then the tripwire value passes through the stages of OR gates and registers and appears on the "consolidated tripwire bus" 134. Because two picoengines did not supply two valid tripwire values at the same time, when the tripwire value appears on the consolidated tripwire bus 134 the associated collision bit 135 is a digital "0". If, however, more than one of the picoengines outputs a valid tripwire value during a given clock cycle of the clock signal CLK, then the TDMCDC 116 detects a collision condition and causes the collision bit 135 to be set to a digital "1".

As shown in FIG. 11, the stages of the TDMCDC are pipelined by registers 136-140, and these registers are all clocked by the same clock signal CLK that clocks the picoengines. The picoengines output their tripwire values synchronously with respect to the clock signal CLK, so the presence or absence of the collision condition is determined once per clock cycle. The resulting twelve bits (one collision bit 135 and eleven of the original twelve tripwire value bits 142) are supplied via the consolidated tripwire bus 134 to a FIFO 141 of the event packet generating circuit 87 of the event ring circuit 77. The event packet generating circuit 87 of FIG. 5 takes the oldest tripwire value from FIFO 141 and if there is a vacancy in event packet flow on the event bus, then the event packet generated circuit 87 generates a new event packet whose data payload is the tripwire value, and injects the new event packet onto the event bus. The 12-bit event data field of the event packet is the eleven original bits of the tripwire value and the added single collision bit 135.

As described above, the event bus of the IB-NFP is configured to form an event ring and/or an event chain, such that the new event packet eventually is received by the event bus manager 144 in the DICIOT 11 of FIG. 1. The event bus manager 114 of the ARM island receives the event packet and extracts the tripwire value and the single collision bit. The ARM processor 145 receives this tripwire value and outputs it via the GPIO/JTAG circuitry 13. The tripwire value is carried via the JTAG to USB cable to the debug station 3.

FIG. 15 is a table that sets forth the bits of a tripwire value. Note that the valid bit is removed from the tripwire value in the TDMCDC, and that the collision bit is added to the tripwire value in the TDMCDC. A tripwire value as output by a picoengine is twelve bits and includes: 1) a valid bit, 2) a 6-bit picoengine number that identifies the picoengine that generated the tripwire data, 3) a hit bit that indicates whether it was a tripwire0 instruction or a tripwire1 instruction that caused the tripwire value to be generated, and 4) a 4-bit tripwire data value. The tripwire value as output by the TDMCDC does not include the valid bit, but has an accompanying collision bit that indicates that more than one picoengine has output a tripwire value at the same time.

Figure 16:
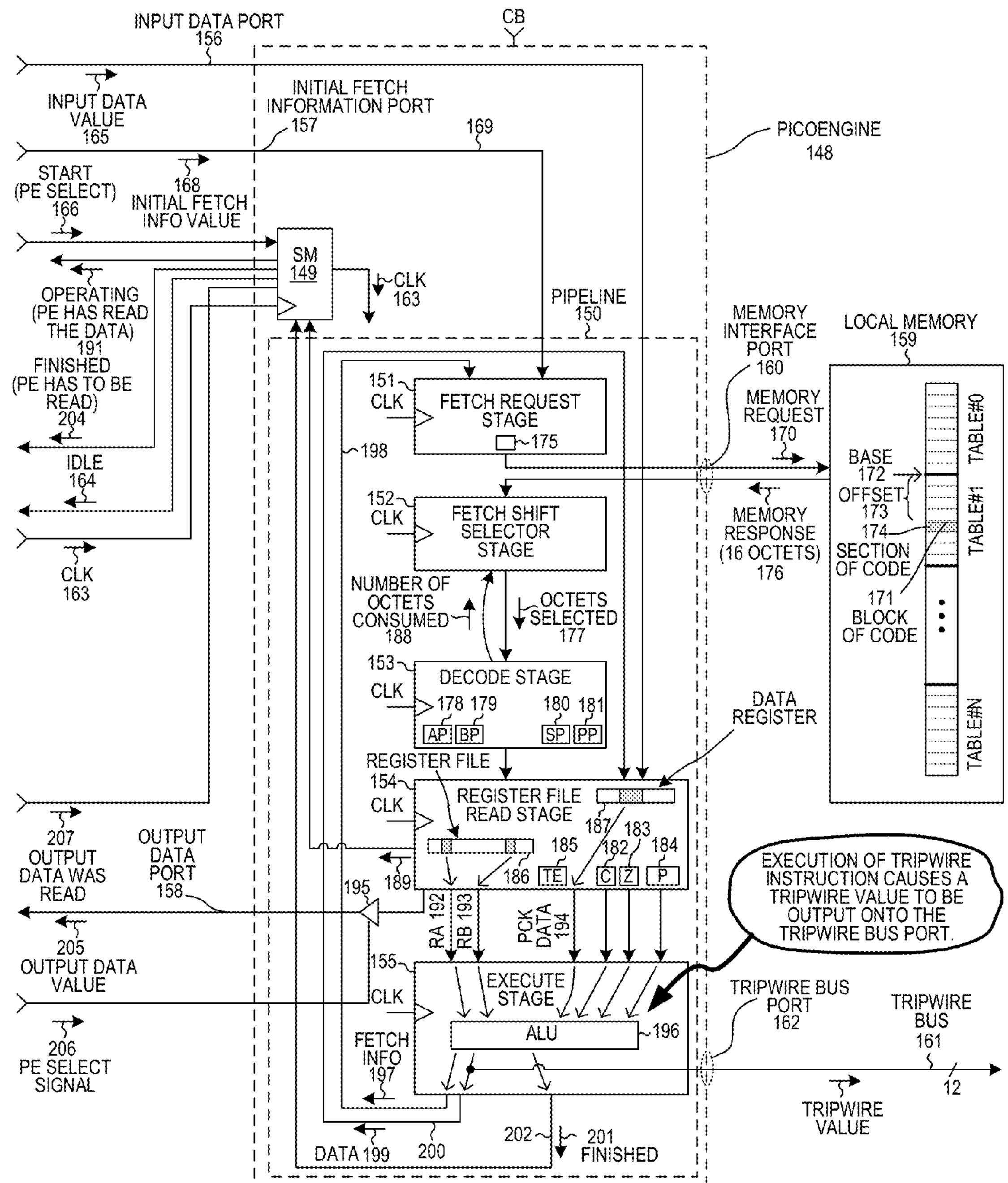
FIG. 16 is a simplified block diagram of one of the picoengines in the picoengine pool of FIG. 9.

FIG. 16 is a high-level block diagram of picoengine PE1 148. The picoengine 148 includes a clock control state machine 149 and a pipeline 150. The pipeline 150 includes a fetch request stage 151, a fetch shift selector stage 152, a decode stage 153, a register file read stage 154, and an execute stage 155. The picoengine receives input data values via input data port 156, and receives initial fetch information values via initial fetch information port 157, outputs output data values via output data port 158, interfaces to a local memory 159 via a memory interface port 160, outputs a tripwire value 161 via a tripwire bus port 162.

Figure 17:
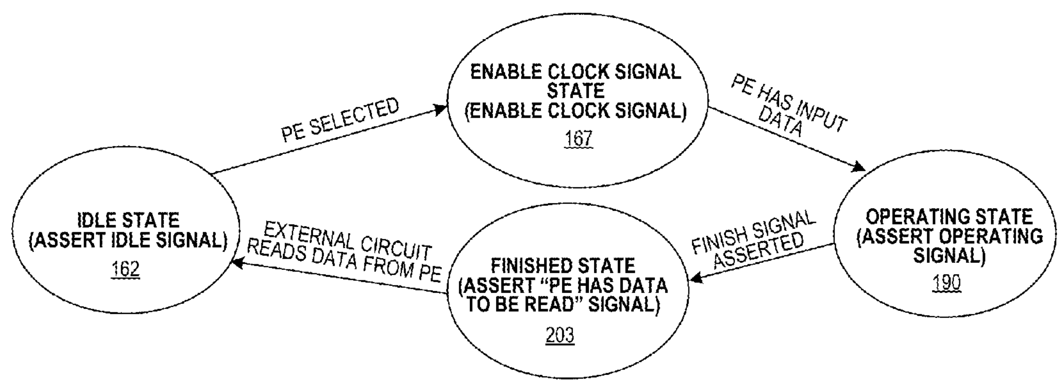
FIG. 17 is a state diagram for the state machine 149 in the picoengine of FIG. 16.

Initially, the state machine 149 is in the idle state 162 (see that state diagram of FIG. 17). The pipeline 150 is clocked by the clock signal CLK 163. In the idle state, the state machine disables the clock signal CLK from clocking the pipeline. The pipeline is therefore not being clocked, and power consumption of the picoengine is reduced. In the idle state, the state machine also outputs the idle signal 164. If the processor is idle, then the picoengine and task assignor 113 supplies an input data value 165 onto the input data port 156 of the picoengine and asserts the start signal 166 (also referred to as the "PE select signal"). The input data port 156 in this case is a set of conductors that extends from outside the picoengine and to the register file read stage 154. The asserting of the start signal 166 informs the picoengine that the input data value on the input data port is available to be read. In response to the assertion of the start signal, the state machine 149 transitions to the enable clock signal state 167 (see the state diagram of FIG. 17).

The transition of the state machine 149 to the enable clock signal state 167 enables the pipeline 150 by supplying the clock signal CLK 163 to the pipeline 150. At the same time that the input data value 165 is being supplied to the picoengine and to the input data port 156, an initial fetch information value 168 is also being supplied to the picoengine via conductors 169 and initial fetch information port 157. The initial fetch information value 168 is an output of the TCAM 119 (see FIG. 9).

The fetch request stage 151 generates memory requests that are supplied to the local memory 159 via memory interface port 160. The fetch request stage 151 can only output a memory request in response to either: 1) an incoming input data value and/or an incoming initial fetch information value, or 2) a fetch information value supplied to the fetch request stage as a result of execution by the pipeline of a fetch instruction. The incoming input data value 165 and/or initial fetch information value 168 prompts the pipeline 1150 to issue a memory request 170. The memory request 170 is communicated to the local memory 159. As explained in further detail below, the memory request 170 is a request to read one 128-bit word 171 from the local memory, where the address of the 128-bit word 171 is given by a base address value 172 and an offset value 173. The 128-bit word 171 is located at the beginning of a section 174 of code. A 128-bit word is also referred to here as a "block of information". The memory local memory is organized as a set of uniquely addressable 128-bit words. The base address value identifies the beginning of a table, TABLE#1 in this case, of code. The offset value identifies an offset from the base address 172 at the beginning of the table to the beginning of the section 174 of code. The local memory stores many such tables of code. The tables in FIG. 16 are denoted TABLE#0, TABLE#1, to TABLE#N.

In one specific example, the particular section 174 of code that the processor is prompted to fetch within table TABLE#1 depends on the initial fetch information value 168. The particular table as well is determined by the initial fetch information value 168. The initial fetch information value 168 includes a table number value. The fetch request stage 151 includes a table number to base address lookup circuit 175. The table number value is supplied to the lookup table circuit 175, and the lookup table circuit 175 outputs the base address value for the table. The base address value is then incorporated into the actual memory request 170.

The local memory 159 responds by returning to the picoengine 148 a memory response 176. The memory response 176 includes one 128-bit block of information at the beginning of the identified section 174 of code. The 128-bit block of information 171 contains sixteen octets. The 128-bit block of information 171 includes a plurality of instructions, where an instruction can involve one, two or three octets, depending on the type of instruction. The number of instructions in a 128-bit block is therefore variable. The 128-bit block of information 171 is received by the fetch shift selector stage 152. The fetch shift selector stage 152 stores the 128-bit block of information 171, and then outputs three octets to the decode stage 153, where the particular octets output include the next instruction to be consumed next by the pipeline. Immediately after the fetch of the 128-bit block 171, it is the first, second and third octets of the 128-bit block that are output from the fetch shift selector stage 152.

The decode stage 153 receives the selected octets 177, and decodes the instruction. Based on the instruction, the decode stage 153 loads an A register pointer AP 178, a B register pointer BP 179, a carry flag bit C 182, a zero flag bit Z 183, a stack pointer SP 180, a packet pointer PP 181, predicate bits P 184, and a tripwire enable/disable bit TE 185. The A register pointer AP 178 identifies one register (8-bit portion) of a register file 186 in the register file read stage 154. This identified 8-bit portion contains the value of the A register for the instruction to be executed. The B register pointer BP 179 identifies another register (8-bit portion) of the register file 186 that contains the value of a B register for the instruction to be executed. The stack pointer SP 180 identifies one register (8-bit portion) of the register file 186 that is the top of the stack. The 8-bit portions of the register file are usable as a stack, and there are instructions in the instruction set of the processor that use the stack. The packet pointer PP 181 identifies one bit in the input data register 187 in the register file read stage 154, where the bit is the first bit of a multi-bit value that may be used in the instruction to be executed. The predicate bits P 184 are three-bits that may be used by an instruction to specify a predicate condition function. In addition to determining these pointer values, the decode stage 153 sends a "number of octets consumed signal" 188 back to the fetch shift selector stage 152. The number of octets consumed depends on the instruction just consumed. If the instruction just consumed involves only one octet, then the decode stage 153 informs the fetch shift selector stage 152 to shift the bits the fetch shift selector stage outputs by one octet. If the instruction just consumed involves two octets, then the decode stage 153 informs the fetch shift selector stage 152 to shift the bits the fetch shift selector stage outputs by two octets. If the instruction just consumed involves three octets, then the decode stage 153 informs the fetch shift selector stage 152 to shift the bits the fetch shift selector stage outputs by three octets. Which octets of the block of information 171 that are output by the fetch shift selector stage 152 are therefore determined by the decode stage 153 using the number of octets consumed signal 188.

The register file read stage 154 stores the input date value 165 into the input data register 187, and sends a signal 189 back to the state machine 149, thereby causing the state machine 149 to transition from the enable clock signal state 167 to the operating state 190 (see the state diagram of FIG. 17). The state machine 149 signals the picoengine and task assignor 113 (see FIG. 9) that the picoengine has received the input data value 165 by outputting an operating signal 191. The picoengine and task assignor 113 can then stop driving input data value 165 onto the input data port 156.

The register file read stage 154 uses the pointer values 178 and 179 from the decode stage to identify the portions of the register file 186 that store the A register value RA 192, and store the B register value RB 1921. The register file read stage 154 uses the packet pointer value 181 from the decode stage to identify the portion of the input data register 187 that stores the PCK data value 194 to be used by the instruction. The contents of the register file 186 are output from the register file read stage 154 to the output buffers 195, but the output buffers 195 are disabled. The contents of the register file 186 is therefore not driven onto the output data port 158.

The execute stage 155 receives the RA value 192 (the contents of the A register), the RB value 193 (the contents of the B register) and the PCK data value 194 from the register file read stage 154. These values are inputs to an ALU 196 (Arithmetic Logic Unit) in the execute stage 155. The instruction operation to be performed, using these values, is determined by control signals (not shown) received from the decode stage 153, where the instruction operation is determined by the opcode of the instruction. The instruction set of the processor includes several different types of instructions including: ALU instructions, memory access instructions for data, instruction fetch instructions, and processor control instructions. Some of the instructions use the packet pointer 181 and the input data register 187 so that the instruction can obtain and use a part or parts of the input data value 165. Although not illustrated, there is also another pointer and another register, where the other register stores the initial fetch information value 168. Other instructions use this pointer and this other register to obtain and use a part or parts of the initial fetch information value 168. In addition, flags are included into the input data value 165 as stored in the input data register 187, so these flags are also available for reference by instructions executed by the picoengine. After an instruction has been consumed by the decode stage of the pipeline, the next instruction in the fetched block of information is supplied to the decode stage. The instructions of the fetched block of instructions are supplied to the decoder and are decoded one by one.

If the execute stage is executing a fetch instruction, then the execute stage supplies fetch information 197 back to the fetch request stage 151 via conductors 198. The execute stage also supplies associated data 199 via conductors 200. In the same way that an externally prompted fetch is prompted by fetch information received on initial fetch information port 157 and input data value received on input data port 156, so too is an internally prompted fetch from the execute stage 155 prompted by fetch information 197 on conductors 198 and data 199 on conductors 200.

As stated above, once the pipeline is operating it does not and cannot fetch instructions unless either: 1) it is prompted to by the receipt of another input data value (and associated initial fetch information value) or, 2) it is prompted to by execution of a fetch instruction. If the picoengine executes the last instruction of the fetched block of information and there is not a next instruction that has already been fetched, then the picoengine would hang. Accordingly, in the present example, the last instruction of the fetched block of information 171 is another fetch instruction. This last fetch instruction causes the picoengine to fetch the next 128-bit block of information from the same section 174 of code. The processor then continues on executing instructions from this second 128-bit block of information. The section 174 of code has a particular function. At the end of the code for performing this function is another fetch instruction, but this fetch instruction is an instruction to fetch the next 128-bit block of code from another table. In this way, the code executed by the processor is modular, with the code of one table causing a fetch into the code of another table, and so forth, from table to table. When fetching into the next table, the offset into the table is typically determined by a characteristic of the input data value 165, as recorded by flags generated by the characterizer 98. In some embodiments, the flags as determined by the characterizer are incorporated into the input data value as stored in the input data register. When execution jumps from one table to the next, the particular section of code that is specifically tailored to data having a characteristic is vectored to (as opposed to vectoring to another section of the table whose code is not for data having the characteristic) due to the fetch instruction having access to the flags.

After the functions of the code have been carried out and execution of the code has traversed from table to table, a final "finished instruction" is executed. Execution of the finished instruction causes the execute stage 155 to assert a finished signal 201 on conductor 202. Asserting of the finished signal 201 causes the state machine 149 to transition from the operating state 190 to the finished state 203 (see the state diagram of FIG. 17). In the finished state 203, the state machine 149 asserts a finished signal 204 that is output from the picoengine 148. The finished signal 204 as output from the picoengine is also referred to as the "PE has data to be read" signal. Assertion of the finished signal 204 indicates to the output data reader circuit 115 (see FIG. 9) that the picoengine has data to supply to the output data reader circuit. In response to the assertion of the "PE has data to be read" signal 204, the output data reader circuit 115*t* enables the outputting of the data output value 205 onto output data port 158 by asserting a "PE select signal" 206. Assertion of the PE select signal 206 causes the output buffers 195 to be enabled. The buffers 195 then drive the contents of the register file 186 onto the output data port 158 and to the output data reader circuit 115. Execution of the finished instruction also causes the state machine 149 to stop the clock signal CLK from being supplied to the pipeline. The pipeline therefore stops clocking, and power consumption is reduced.

While the PE select signal 206 is asserted and the output data value 205 is being driven onto the output data port 158, the output data value is read from the output data port. The output data reader circuit 115 then deasserts the PE select signal 206 thereby disabling driver 195, and asserts an "output data was read" signal 207. Assertion of the "output data was read signal" 207 causes the state machine 149 to transition to the idle state 162. In the idle state 162, the state machine asserts the idle signal 164. At this point, the pipeline is not being clocked, but it is ready to receive another input data value and another associated initial fetch information value.

Figure 18:
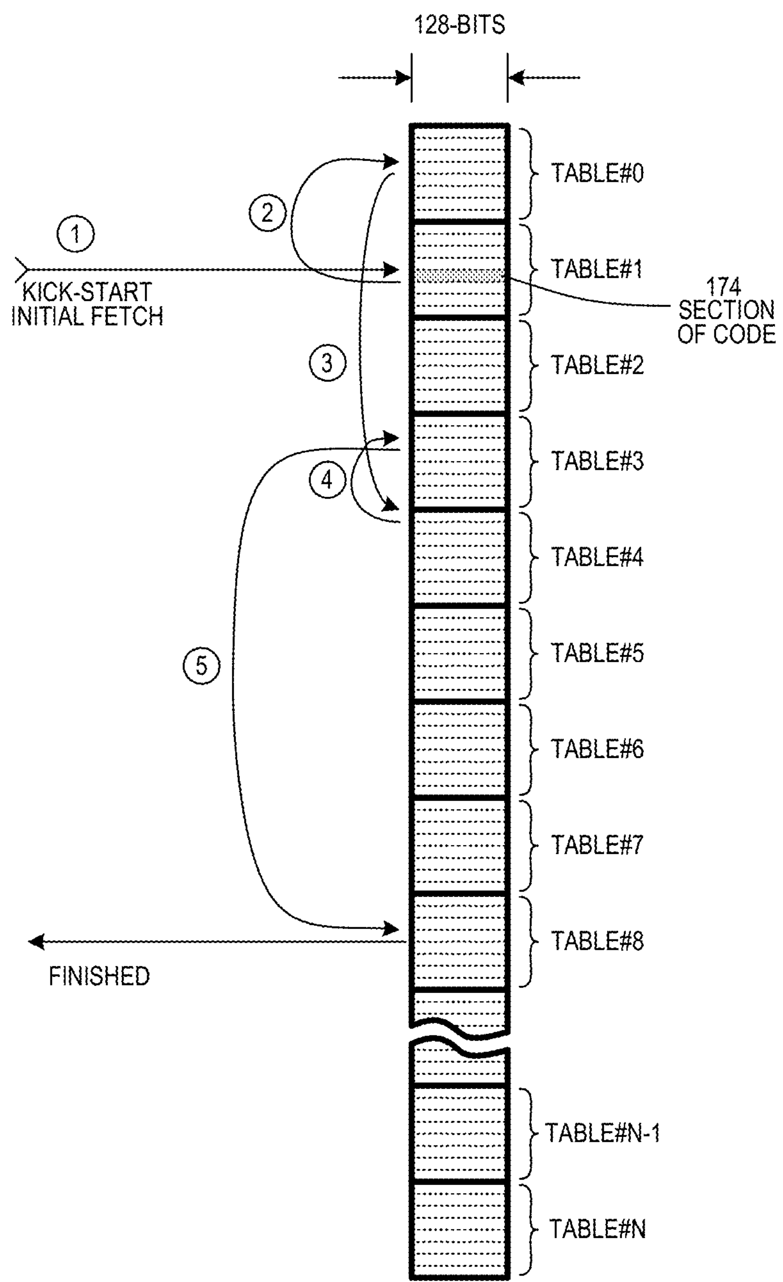
FIG. 18 is a diagram that shows many small sections of specialized picoengine code as that codes is stored in the local memory of FIG. 16.

FIG. 18 is a diagram of the program code stored in the local memory 3. The memory is organized as many uniquely addressable 128-bit blocks of information. There are many such 128-bit blocks of information in one section of code, and there are many sections of code in one table, and there are N tables stored in the memory. In the illustrated example, the initial fetch (the one initially prompted from outside the picoengine by incoming data) is identified by the circled numeral "1". The incoming initial fetch information causes the pipeline to start clocking. The resulting first fetch from the external memory has a base address 172 that identifies the first word 171 (first 128-bit block) of TABLE#1. The table number given by the initial fetch information value 168 is translated by the lookup table circuit 175 into the base address value 172 that is then used in the memory request 170. The offset 173 from the beginning location of TABLE#1 identifies the beginning 128-bit block 171 of section 174 of code. This offset is specified by the initial fetch information. Once all the blocks of this section of code have been executed, a fetch instruction causes code execution to jump to the fourth section of TABLE#0. This is identified in FIG. 17 by the circled numeral "2". After execution of this section of code, a fetch instruction causes code execution to jump to the first section of the code of TABLE#4. This is identified in FIG. 17 by the circled numeral "3". The instruction fetches that causes the fourth and fifth jumps are identified in FIG. 17 by the circled numerals "4" and "5". At the end of the fourth section of code of TABLE#8 is a "finished" instruction. This finished instruction causes the pipeline to stop clocking, and causes an external circuit to be signaled that the picoengine has an output data value to be read on its output data port. The external circuit reads the output data value via output data reader circuit 115.

Each section of code is typically an amount of code that is specialized to do a particular discrete task on input data having a particular characteristic or characteristics. In one simplified illustrative example, a first section of code does VLAN and MAC address processing, a second section of code does IP header analysis processing, a third section of code does tunnel decapsulation processing, and a fourth section of code does inner header processing. Execution of a fetch instruction at the end of the first section references an IP header version flag (a flag in the initial fetch information value 168 that indicates whether packet data is IPv4 or IPv6), and as a result of this flag fetches code at the beginning of the second section. Execution of a fetch instruction at the end of the second section references a header value in the input data value 165 (the header value indicates whether the packet is a tunnel packet, and if so what kind of tunnel), and as a result of this header value fetches code at the beginning of the third section. Execution of a fetch instruction at the end of the third section references a set of data values stored in local memory 159 (the set of data values indicates whether the packet data is an Ethernet frame or an IP packet), and as a result of this set of data values fetches code at the beginning of the fourth section. Another processor (a microengine (ME) processor not shown) preloads the set of data values into the local memory 159 so that the set of data values is later usable by picoengine 148 executing a fetch instruction to determine which section of code to execute next. Local memory 159, in addition to storing blocks of information of code, stores many such sets of data values.

In one example, the picoengine of FIG. 16 is one of many such identical picoengines in the picoengine pool 114. The picoengines are supplied with data and are assigned tasks, one by one, in a particular order. If a processor circuit of the pool is assigned a task, then it performs the task until it has a resulting output data value. An individual picoengine that has an output data value to be read then holds its output data value until the output data value is read from the picoengine. The resulting output data values from the picoengines are read out of the pool one by one, in the very same order in which tasks were assigned, and the resulting data values are stored in an external FIFO. To perform this reading of the data values from the pool, the output data reader circuit supplies a PE select signal to each of the picoengines, but it only asserts one PE select signal going to one picoengine at a time. The currently selected picoengine is made to output its output data value onto a common output bus, and the output data value is communicated via this bus to the FIFO. After the output data value is stored in the FIFO, the output data reader circuit deasserts the PE select signal and asserts another PE select signal, so that another of the picoengines will then output its output data value onto the common output bus. In this way the output data values from picoengines are read, one by one. Each output data value includes a buffer pool number value that indicates a particular microengine (ME) processor that will perform further processing on the data. A first particular type of input data values will typically be further processed by a first ME processor, whereas a second particular type of input data values will typically be further processed by a second ME processor, and so forth. The buffer pool numbers in the output data values are used to control which of the subsequent processing ME processors will further process which output data values being output from the pool. For additional information on a picoengine pool and an output data reader, see: U.S. patent application Ser. No. 14/251,592, entitled "Picoengine Multi-Processor With Task Management", filed Apr. 12, 2014, by Gavin J. Stark (the entire subject matter of which is incorporated herein by reference).

Figure 19:
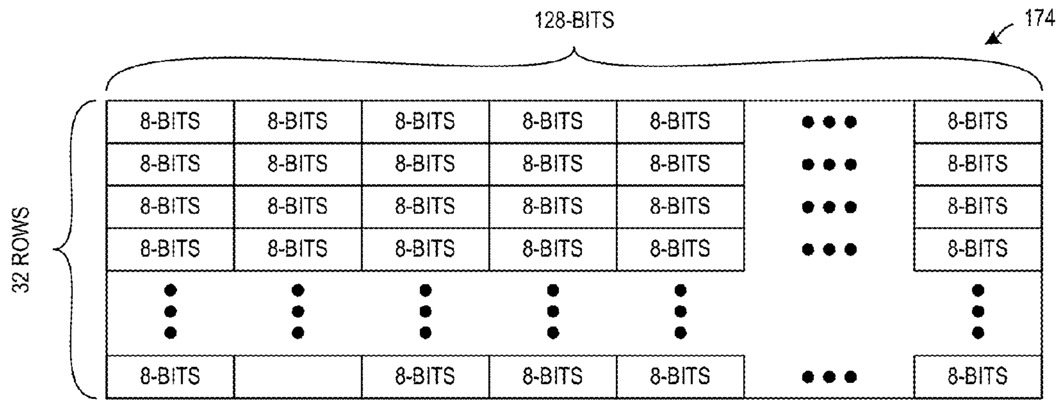
FIG. 19 is a diagram of one section of picoengine code.

FIG. 19 is a diagram of section 174 of code. Each such 128-bit block of information (one row in the diagram) includes 16 octets. In this example, there are thirty-two 128-bit blocks of information in the section 174.

Figure 20:
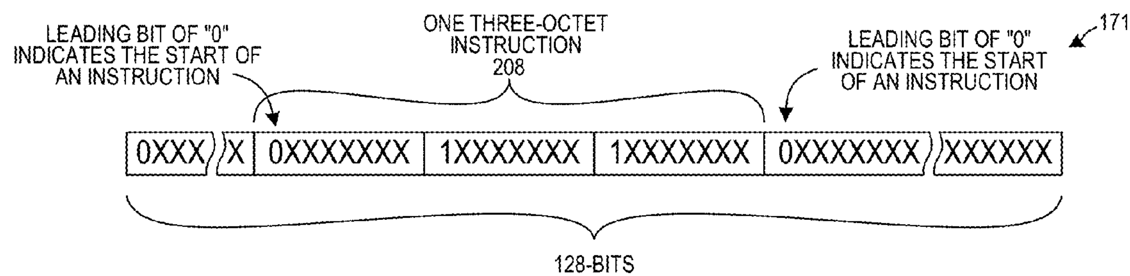
FIG. 20 is a diagram that illustrates the octets in one 128-bit block of code.

FIG. 20 is a diagram of the 128-bit block of information 171, and one three-octet instruction 208 within the block 171. The first octet of each instruction starts with a "0" bit. The second octet of a multi-octet instruction starts with a "1" bit. The third octet of a three-octet instruction starts with a "1" bit. The decode stage 10 uses these leading bits of the octets to parse the octets of a block of information and to identify the boundaries between instructions.

Figure 21:
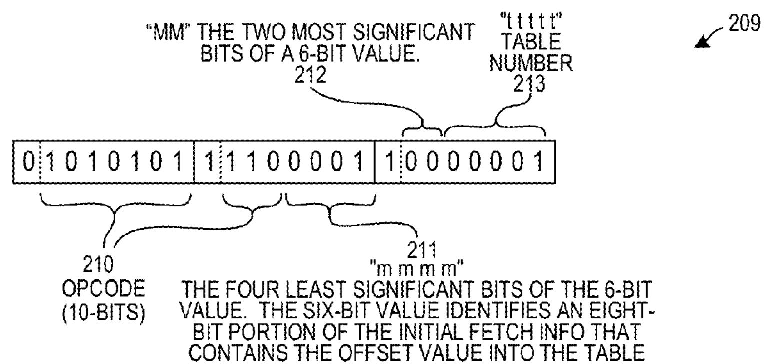
FIG. 21 is a diagram of a fetch instruction, where the offset is a value in the initial fetch information value that is received onto the picoengine along with the input data.

FIG. 21 is a diagram that illustrates a fetch instruction 209 where the offset value is a value in the initial fetch information value. The instruction is a three-octet instruction. The opcode 210 is ten bits. The four "mmmm" bits 211 and the two "MM" bits 212 together form a six-bit value, where this six-bit value identifies one eight-bit portion of the initial fetch information value that contains the offset value. Each eight-bit portion of the initial fetch information value is numbered, and the value "MMmmmm" is the number of one of these eight-bit portions. The five "ttttt" bits 213 indicate the table number. As mentioned above, in one example the table number is translated by the lookup table circuit 175 into the base address value where the table starts in memory.

FIG. 22 is a diagram that illustrates a fetch instruction 217 where the offset value is a value in the input data value. The instruction is a two-octet instruction. The opcode 214 is seven bits. The two "MM" bits 215 indicate the memory that contains the table. In the present example, local memory 159 is identified by an "MM" value of "00". The five "ttttt" bits 216 indicate the table number. The packet pointer identifies one of the eight-bit portions of the input data value, and this eight-bit portion is used as the offset value.

FIG. 23 is a diagram that illustrates a fetch instruction 218 where the offset value is in a specified register in the register file 186. The instruction is a three-octet instruction. The opcode 219 is ten bits long. The four "nnnn" bits 220 indicate the number of the register in the register file 186 that contains the offset value into the table. The two "MM" bits 221 indicate the memory that contains the table to be fetched from. The five "ttttt" bits 222 specify the table number.

FIG. 24 is a diagram that illustrates a fetch more instruction 223. This instruction is one octet in length, and only contains a seven-bit opcode 224. The instruction causes a fetch of the next 128-bit block of information that is located in the memory immediately after the last 128-bit block of information that was fetched. The memory from which the fetch is conducted is the same memory from which the last fetch was conducted.

FIG. 25 is a diagram of a two-octet conditional skip instruction 225 that explicitly specifies a skip count and a predicate function. The opcode 226 of skip instruction 225 is "1110000". If a predicate condition as determined by the value of the predicate code field 227 is true (if the predicate condition is "satisfied"), then execution of a number of subsequent instructions (instructions that follow the skip instruction in the sequence of instructions fetched) specified by the 3-bit skip count field 228 are "skipped". Inclusion of such a skip instruction into a sequence of instructions generally does not affect or change the number or order or flow of instructions decoded by the decode stage 153 of the pipeline. The number and order and flow of instructions that are decoded by the decode stage 153 may be the same, regardless of whether the predicate condition is satisfied and a subsequent instruction or instructions are skipped, and regardless of whether the predicate instruction is not satisfied and a subsequent instruction or instructions are not skipped. Similarly, the fetching of instructions can be the same, regardless of whether the skip occurs, or not. If the predicate condition of the skip instruction is true and a subsequent instruction or instructions are skipped, however, then the execute stage 155 of the pipeline does not carry out the instruction operation of any skipped instruction. In addition, the skip instruction 225 includes a "flag don't touch" bit 229. If the "flag don't touch" bit 229 is set, then neither the skip instruction 225 nor any subsequent skipped instructions (skipped due to the skip instruction) is enabled to change the values of the carry bit C 182 and the zero bit Z 183. If the "flag don't touch" bit 229 is not set, on the other hand, then either the skip instruction 226 or any subsequent skipped instructions (skipped due to the skip instruction) can change the values of the carry bit C 182 and the zero bit Z 183.

FIG. 26 is a diagram that sets forth the predicate codes indicated by the three predicate bits.

FIG. 27 is a diagram that illustrates a tripwire instruction 230. The opcode 231 is a 7-bit value "111101". The value of the "T" bit 232 indicates whether to use the bottom four bits 233 of the tripwire instruction directly ("immediate") as the four bits that will be the tripwire data field of the tripwire value that will be output due to execution of the tripwire instruction, or whether to use the bottom four bits 233 of the tripwire instruction to identify a register of the register file whose bottom four bits will be the four bits of the tripwire data field of the tripwire value that the will be output due to execution of the tripwire instruction. The least significant bit 234 of the opcode 231 indicates if the tripwire value output was due to execution of a tripwire0 instruction or a tripwire1 instruction.

Figure 28:
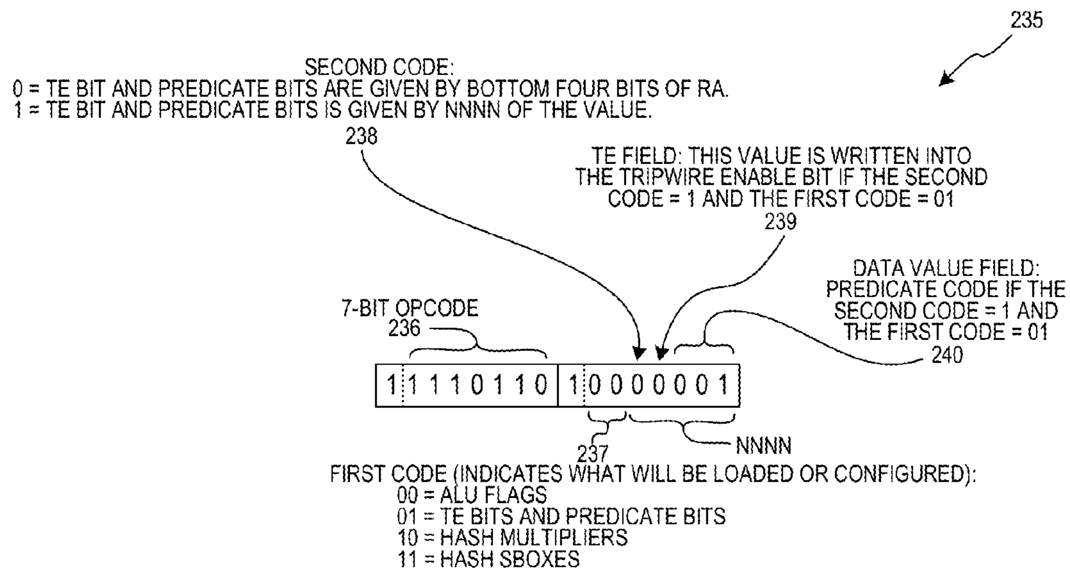
FIG. 28 is a diagram of a novel "load register file read stage control register" instruction that is usable to set or clear the TE enable/disable bit.

FIG. 28 is a diagram that illustrates a "load register file read stage control register" instruction 235. This instruction 235 is also referred to as a "set RF CSR" instruction. The instruction 235 includes a 7-bit opcode 236, a 2-bit first code field 237, a 1-bit second code field 238, a TE bit field 239, and a 3-bit data value field 240. The value of the 2-bit first code field 237 specifies a circuit or amount of circuitry that will be loaded or configured due to execution of the instruction 235. For example, if these two bits are "01", then execution of the instruction 235 will cause the TE bit 185 and three predicate bits 184 in the register file read stage 154 to be loaded. If the value of the second code field 238 is "1" then the least four significant bits of the instruction 235 will be loaded into the TE bit 185 and the three predicate bits P 184 in the register file read stage, whereas if the value of the second code field 238 is "0" then the four least significant bits of the value RA of register A will be loaded into the TE bit 185 and the three predicate bits P 184 in the register file read stage. The load RF CSR instruction 235 is different from most other instructions executed by the processor in that the loading operation it specifies occurs one clock cycle earlier than it would occur were it to be have been carried out by the execute stage in ordinary course. In a first clock cycle, the decode stage 153 decodes the load RF CSR instruction, and the specified loading operation then occurs in the very next clock cycle. Due to the load operation occurring one clock cycle earlier than it ordinarily would, the load RF CSR instruction can be used in an advantageous manner with a preceding instruction where the preceding instruction uses the ALU 196 to determine a value that is then loaded into the A register. In one novel aspect, the preceding instruction uses the ALU 196 to determine a value that then, as a result of execution of the instruction, loads the ALU output value into the register A (as pointed to by the A register pointer AP 178). The very next instruction to be executed by the processor is a load RF CSR instruction, such as the "load register file read stage control register instruction" 235 of FIG. 28. The instruction 235 specifies that the TE bit 185 and the three predicate bits 184 are to be loaded with the least significant four bits of the contents RA of the register A. The instruction 235 is decoded in a clock cycle, and in the very next clock cycle the loading of the TE and predicate bits P occurs. The TE and predicate bits P are loaded with the contents RA of the register A before the contents RA can be changed as a consequence of execution of the instruction 235 itself. Now that the predicate bits P 184 are loaded with the desired values, a next skip instruction can be of the one-octet efficient and short type set forth in FIG. 24, where the predicate code values of the predicate bits 184 are used to specify the predicate function. Alternatively, the next instruction is another type of conditional predicated instruction, where the predicate code values of the predicate bits 184 are used to specify the predicate function. In one novel aspect, there are multiple such efficient and short conditional predicated instructions, where each of the instructions is a short one-octet instruction that does not explicitly set forth the 3-bit predicate code but rather where the 3-bit predicate code is set forth by the same 3-bit value of the predicate bits 184 as stored in the register read file stage 154.

Figure 29:
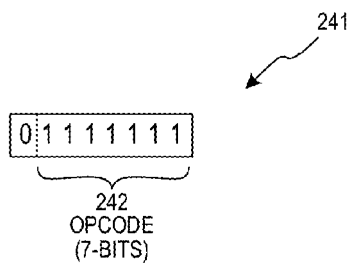
FIG. 29 is a diagram of the finished instruction.

FIG. 29 is a diagram that illustrates the finished instruction 241. This instruction is one octet in length and includes a seven-bit opcode 242. As mentioned above, execution of the finished instruction causes the pipeline to stop clocking, and causes the state machine 149 to transition to the finished state. In the finished state, the state machine 149 causes the picoengine 148 to assert the "PE has data to read" signal 204.

Figure 30:
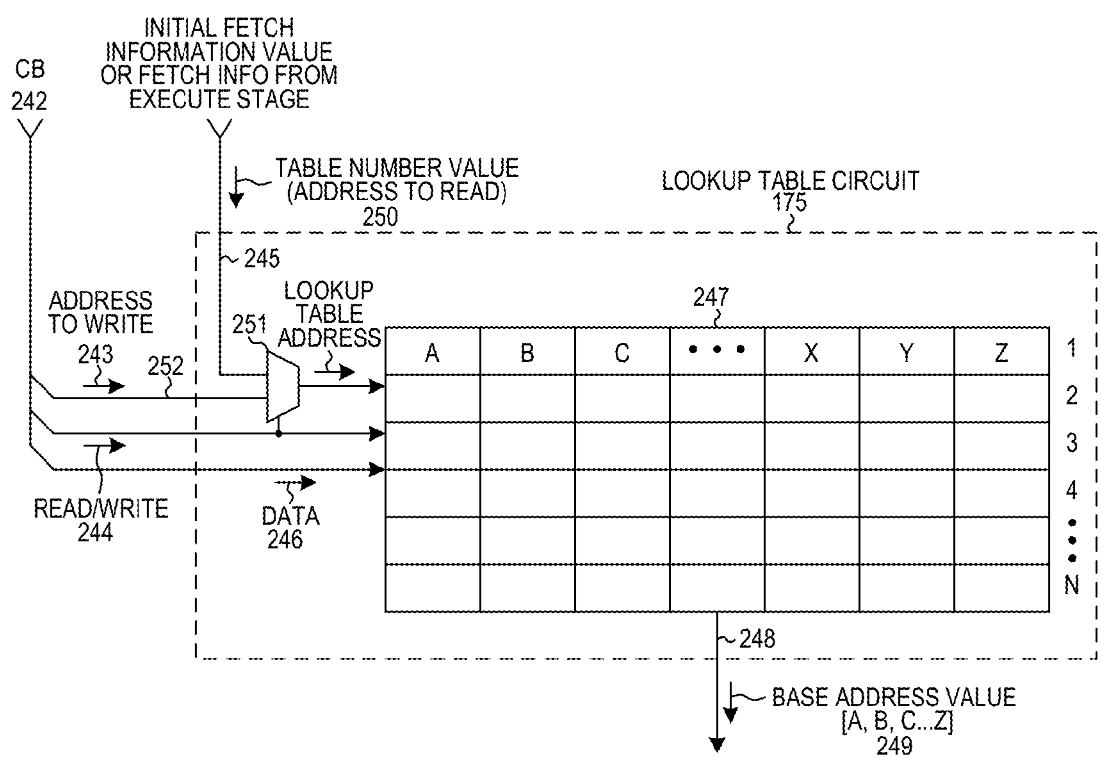
FIG. 30 is a simplified diagram of the table number to base address lookup table circuit within the picoengine of FIG. 16.
Figure 31A:
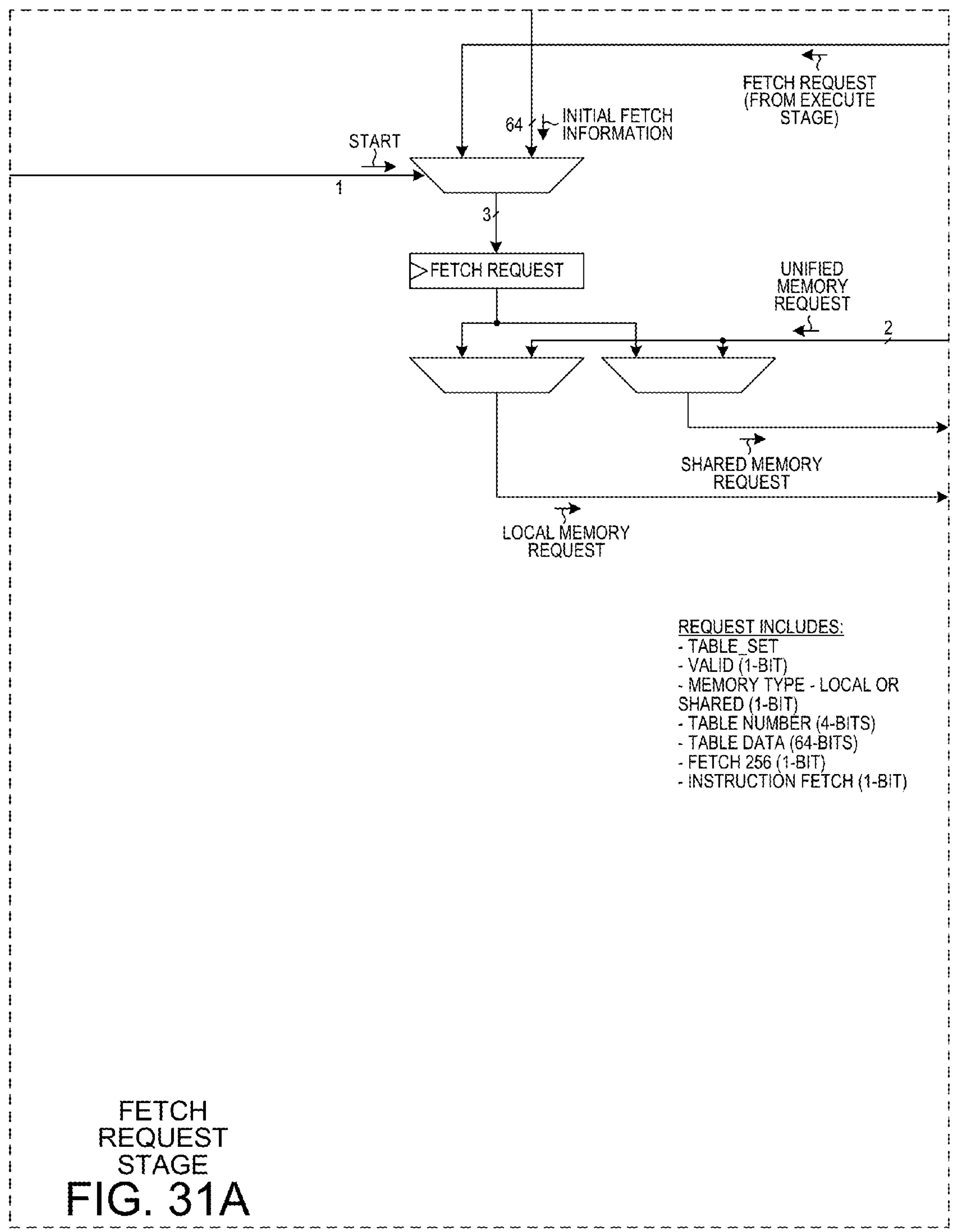
FIG. 31A is a diagram of a part of a larger diagram of FIG. 31, where
Figure 31B:
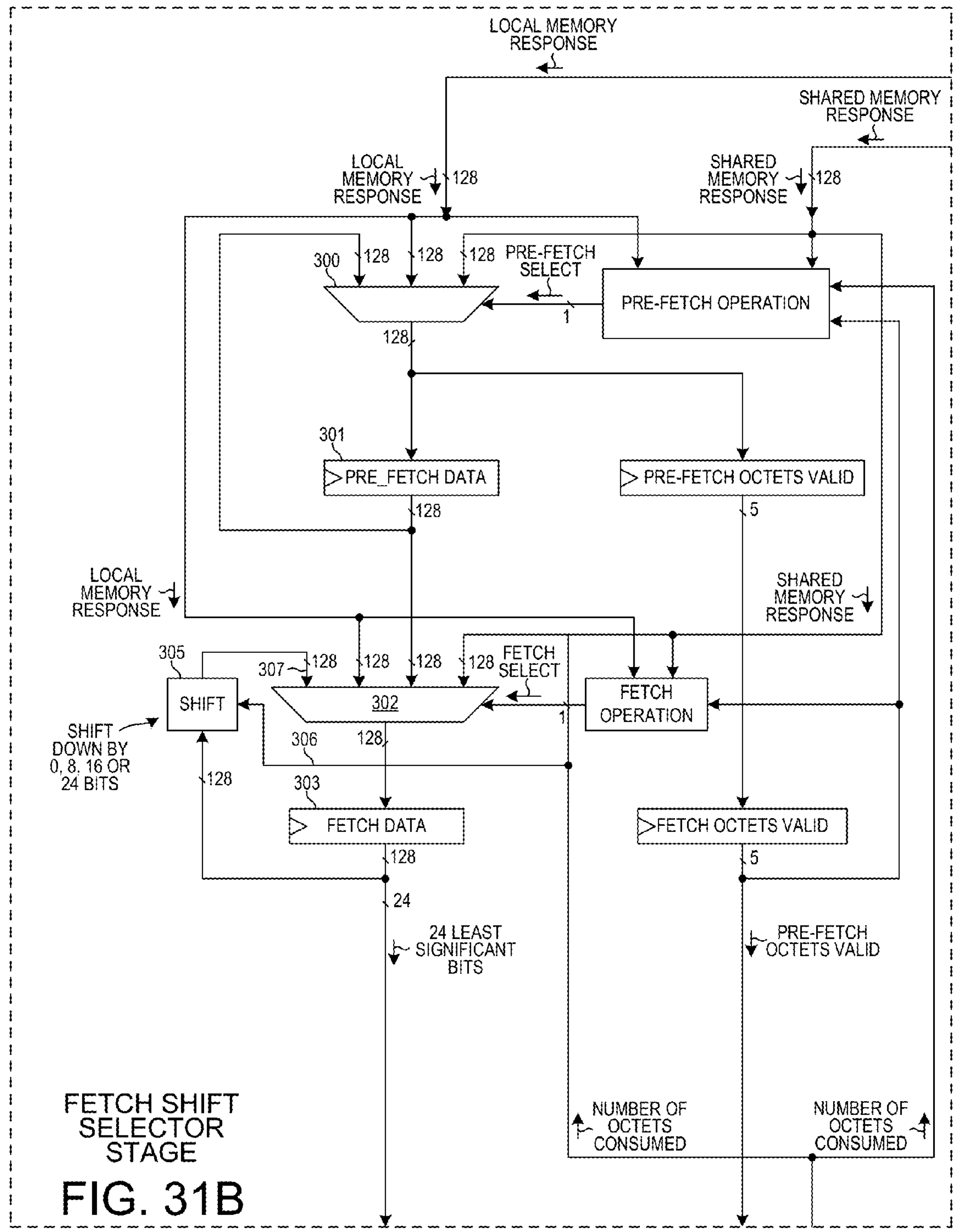
FIG. 31B is a diagram of a part of a larger diagram of FIG. 31.
Figure 31D:
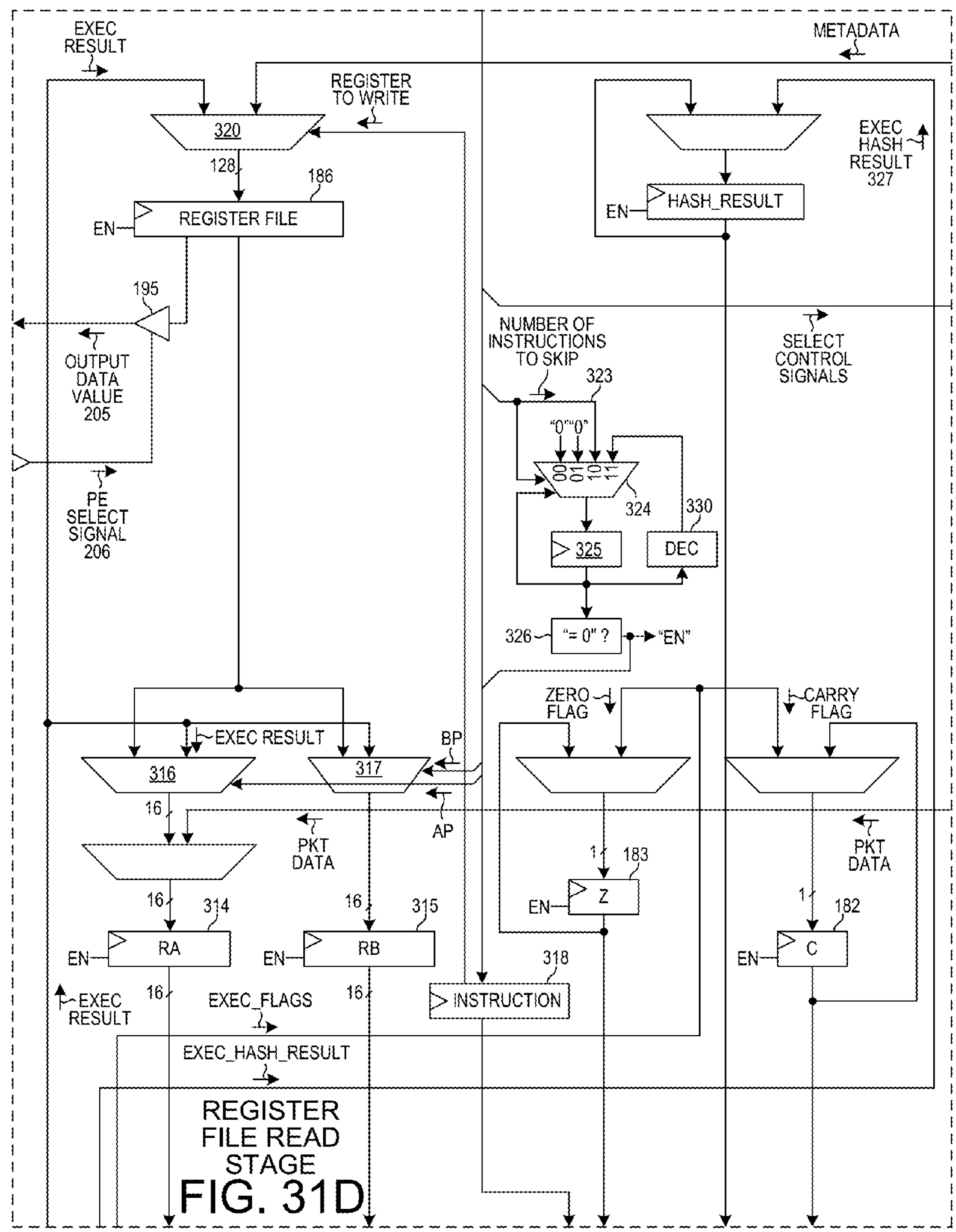
FIG. 31D is a diagram of a part of a larger diagram of FIG. 31.
Figure 31E:
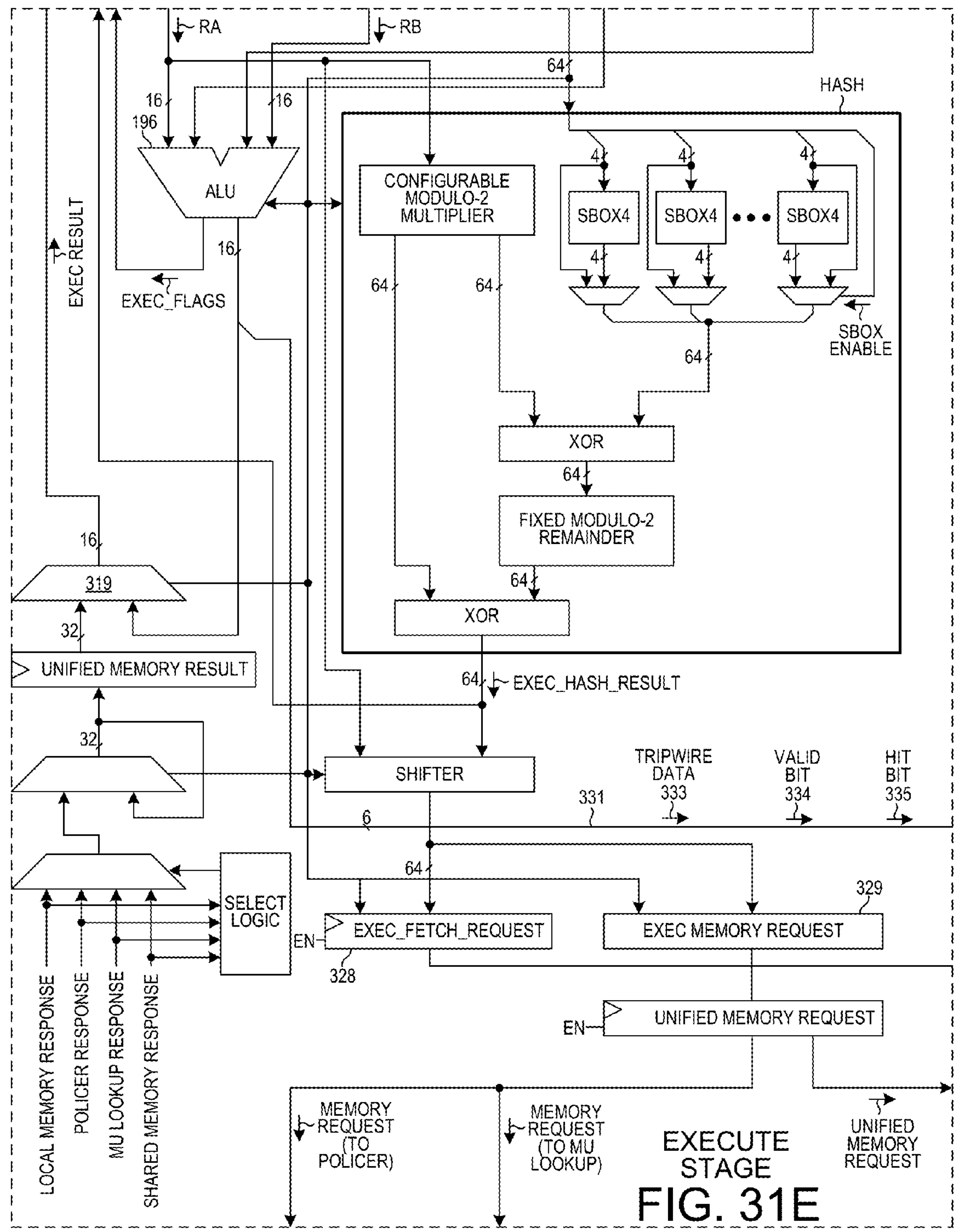
FIG. 31E is a diagram of a part of a larger diagram of FIG. 31.
Figure 31F:
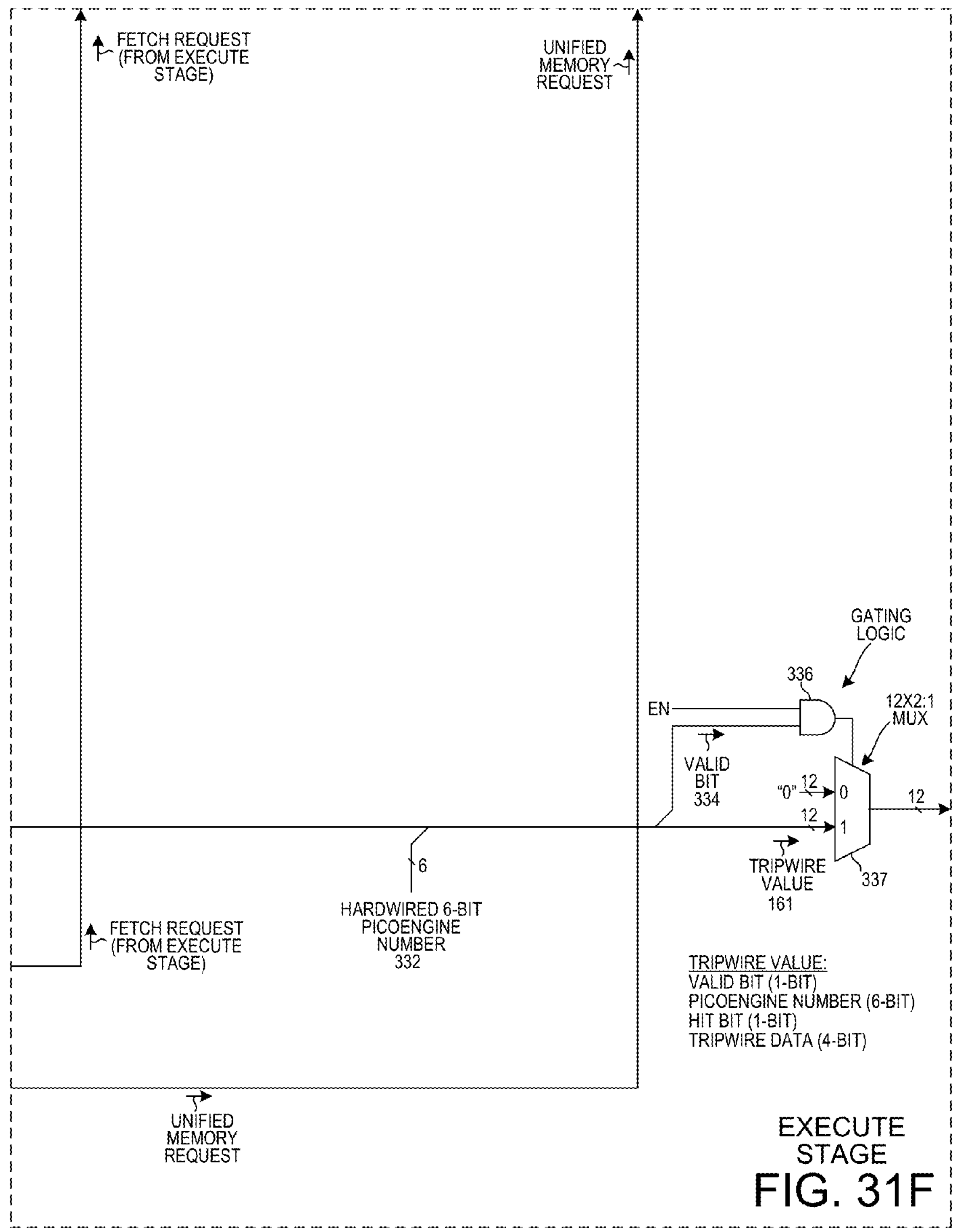
FIG. 31F is a diagram of a part of a larger diagram of FIG. 31.
Figure 31G:
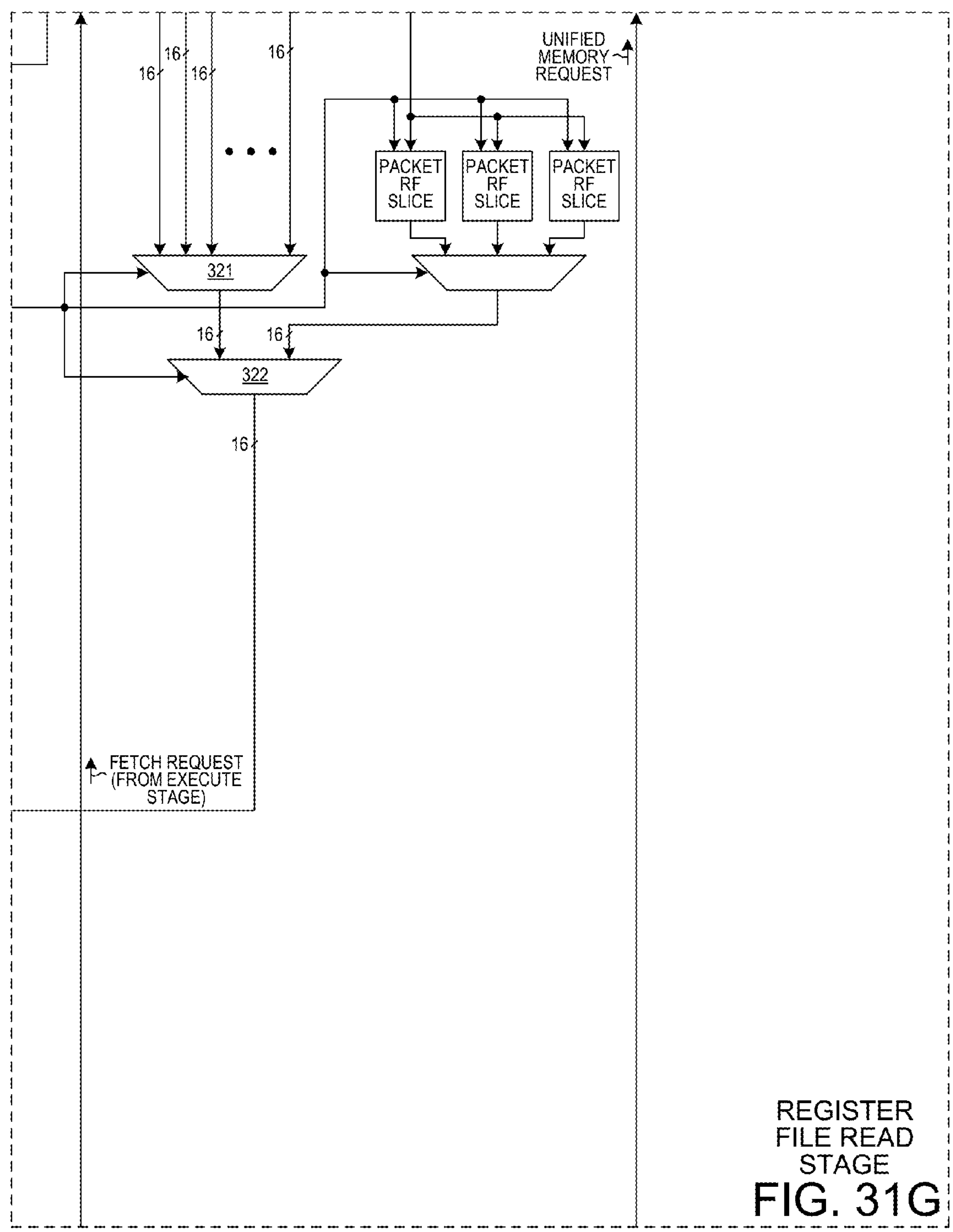
FIG. 31G is a diagram of a part of a larger diagram of FIG. 31.
Figure 31H:
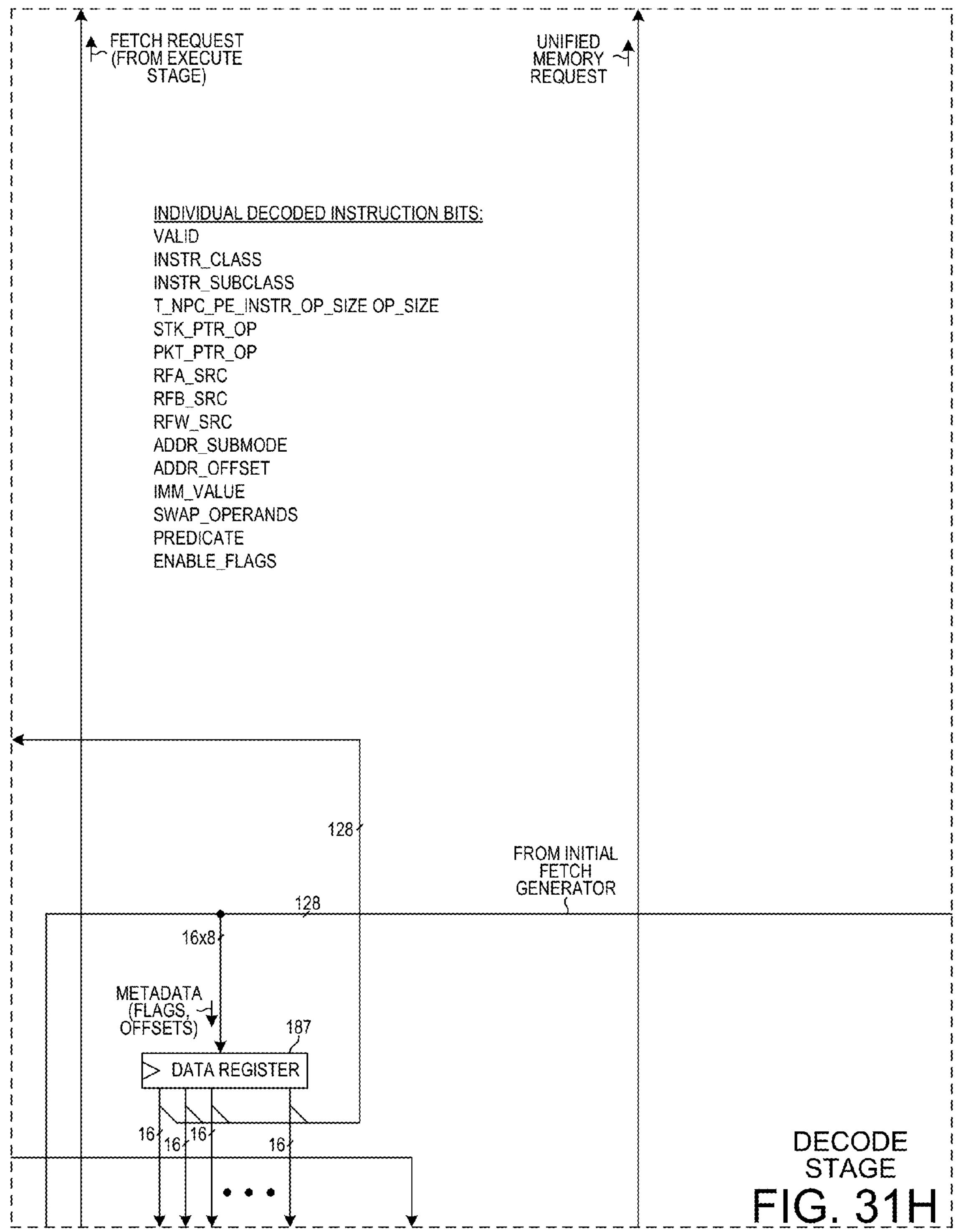
FIG. 31H is a diagram of a part of a larger diagram of FIG. 31.
Figure 31I:
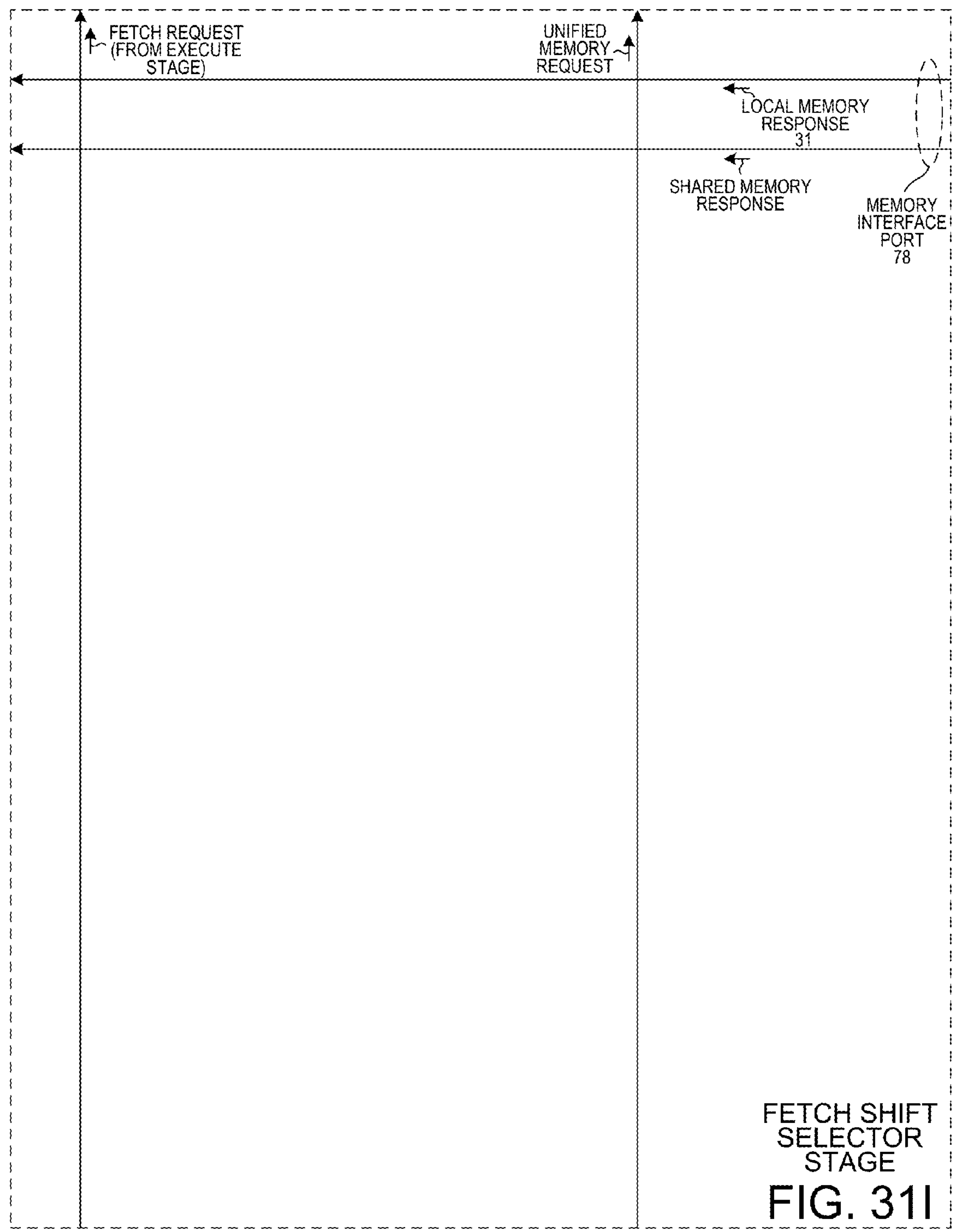
FIG. 31I is a diagram of a part of a larger diagram of FIG. 31.
Figure 31J:
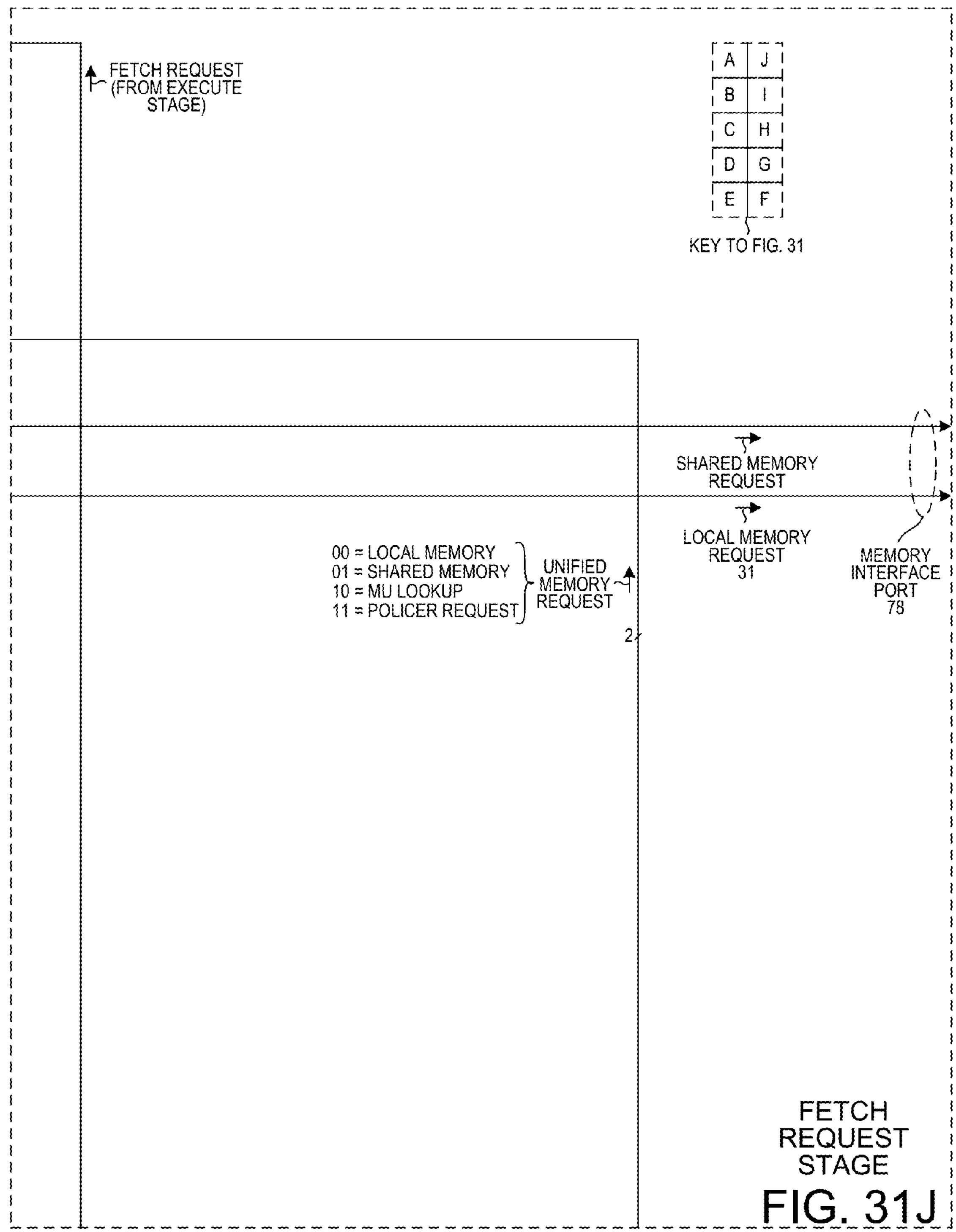
FIG. 31J is a diagram of a part of a larger diagram of FIG. 31.

FIG. 30 is a simplified diagram of the lookup table circuit 175 in the fetch request stage 151 of FIG. 16. The data contents of the memory portion 247 can be written via control bus CB 242. An address 243 of a memory location in the memory portion 247 is supplied via lines 252, and the read/write signal 244 is set to indicate a write operation, and the data 246 to be written is supplied via the control bus 242 to the memory portion 247. In this way, the contents of the addressed memory location of the memory portion 247 are pre-loaded and setup before picoengine operation, or during downtimes during which the picoengine is not being used. To perform a table number value to base address value lookup, the table number 250 is supplied to the lookup table circuit 175 via input conductors 245 when the read/write control signal 244 is set to indicate a read operation. The read/write signal 244 controls the address multiplexer 246. The multi-bit content of the memory location addressed by the table number value is then output from the lookup table circuit 175 onto output conductors 248 as the base address value 2490.

Although in the specific embodiment of FIG. 16, the lookup table circuit 175 is disposed in the fetch request stage 175, in other embodiments the lookup table circuit that converts a table number value into a base address value is disposed in the local memory 159. In still other embodiments, there is no table number to base address lookup table circuit. If a lookup table circuit is disposed in the local memory 159, then the memory request 170 as received onto the local memory 159 may include the table number value. The lookup table circuit of the local memory 159 then uses the table number value to determine the base address value, and the base address value along with the offset value is then used to read the block of information from the memory of the memory system. In the same way that a table number value can be converted into a base address value by a lookup table circuit located in the fetch request stage 151, so too can another value (for example, a flag value or flag values) in the initial fetch information value 168 be converted by a lookup table circuit in the fetch request stage 151 into the offset value. Similarly, a lookup table circuit that converts a flag value or values into the offset value can be located in the local memory 159. The contents of these lookup table circuits can be loaded by the picoengine itself, or in other embodiments can be loaded via the separate control bus (CB) 242.

In one example, to realize an integrated circuit embodiment of the picoengine of FIG. 16, the function of the each circuit block of the picoengine is described in a hardware description language (for example, Verilog or VHDL). A commercially available hardware synthesis program (for example, Synopsis Design Compiler) is then employed to generate digital logic circuitry from the hardware description language description, where the synthesized digital logic circuitry performs the function described by the hardware description language. The picoengine is realized in this way to be a small circuit of about ten thousand equivalent gates. An embodiment of picoengine 148 of FIG. 16 or of picoengine multi-processor 99 of FIG. 9 may be made available by one company as a predesigned block of circuitry that is then incorporated into another company's integrated circuit design as a general purpose block. Such a predesigned block of IP is sometimes referred to in the art as a block of "IP". A hardware designer who incorporates the predesigned block of IP into a larger integrated circuit design need not understand or be aware of the internal structure and operation of the pre-designed block, but rather interfaces to the pre-designed block in accordance with an interface description supplied by the original designer of the predesigned block. Rather than being supplied as a block of IP to be incorporated into another integrated circuit, the novel picoengine 148 or novel picoengine multi-processor 99 can be supplied to end customers as a separate discrete integrated circuit of general utility in data processing applications.

FIG. 31 is a more detailed diagram of one specific implementation of the pipeline 150 of the picoengine 148 of FIG. 16. One 128-bit block of octets is received onto the picoengine from the local memory 159 via memory interface port 160. The 128 bits pass through multiplexer 300 and are latched into pre-fetch data register 301. The 128 bits pass through multiplexer 302 and are clocked into fetch data register 303. The least significant (leftmost) twenty-four of the bits pass from the fetch data register 303 down to a "delineate instruction" block 304 in the decode stage 153. The 128 bits also pass to the left to a shifter 305. The shifter shifts the 128-bit value on its input to the right, either by 0 bits, 8 bits, 16 bits, or 24 bits. The number of bits shifted is determined by the 2-bit value on input leads 306. When performing a shift, the leftmost bits of the resulting shifted value are replaced with one, two, or three NOP instruction opcodes. The resulting shifted 12-bit value is supplied from the shifter 305 to input 307 of multiplexer 302. In the decode stage, the "delineate instruction" block 304 examines the least significant twenty-four bits of the incoming 128-bit block, and looks at the leading bits of the octets. From these leading bits, the "delineate instruction" block determines whether the octet in the least significant bit position is the first octet of a single-octet instruction, or is the first octet of a two-octet instruction, or is the first octet of a three-octet instruction. The number of octets of this first instruction is output as the "number of octets consumed" signal 188. This "number of octets consumed" signal 188 is the control signal supplied to shifter 305. Accordingly, after the first leftmost instruction has been decoded, the 128-bit incoming value to the shifter is shifted to the right by a number of octets such that the leftmost octet of the least significant 24-bits supplied to the "delineate instruction" block 304 is the leftmost octet of the next instruction. In this way, as instructions are decoded, the shifter 305 shifts the 128-bit value to the right a number of octets so that the "delineate instruction" block receives the next instruction to be deciphered.

In addition to determining the number of octets in the instruction, the delineate instruction block 304 also examines the instruction and determines the instruction type, as indicated by the opcode of the instruction. The instruction can be a local operation, a decode packet operation, a decode memory operation, a decode hash operation, a decode fetch operation, or a decode miscellaneous operation. Each of the decode blocks 308-313 examines and decodes the twenty-four bits output by the "delineate instruction" block 304 and outputs a set of fifty-two "individual decoded instruction" bits. For example, three bits of the "individual decoded instruction" bits are denoted "RFA_SRC" and this value is used to generate the pointer AP that is then stored in AP register 178. The pointer AP is used to select a part of the register file 186 that is then clocked into the A register 314. For example, three bits of the "individual decoded instruction" bits are denoted "RFB_SRC" and this value is used to generate the pointer BP that is then stored in register 179. The pointer BP is used to select a part of register file 186 that is then clocked into the B register 315.

Multiplexer 316 receives all the bit values stored in the register file 186, and selects one sixteen-bit portion based on the pointer AP (as supplied onto the select input of the multiplexer 316). Similarly, multiplexer 317 receives all the bit values stored in the register file 186, and selects one sixteen-bit portion based on the pointer BP (as supplied onto the select input of the multiplexer 317). The register file read stage supplies values, such as the contents of the A register 314 and the B register 315, to inputs of the ALU 196. The contents of the instruction register 318 determines the operation performed by the ALU 196. The sixteen-bit output value of the ALU 196 passes through multiplexer 319 and multiplexer 320 and is clocked back into the register file 186. Some of the bits of the register file 186 are the output data value 205. If the output data value 205 is to be read by an external circuit, then the external circuit asserts the PE select signal 206 so that the output buffers 195 are enabled. The output buffers 195 drive the output data value 205 to the external circuit. Depending on the instruction to be executed, the register A 314 can be loaded with a 16-bit part of the contents of the data register 187. Which 16-bit part is determined by the instruction decode. The selected part is supplied by multiplexer 321 and multiplexer 322 to register A 314.

If the instruction being decoded is a skip instruction, then the skip count is supplied via conductors 323 to multiplexer 324. If the number of instructions to be skipped is zero, then either the "00" multiplexer input or the "01" multiplexer input is selected. In either case, a value of zero passes through multiplexer 324 and is latched into register 325. If the value as output by register 325 is zero, then the EN signal output of comparator 326 is asserted. All the registers 186, 327, 314, 315, 183, 182, 328 and 329 have synchronous enable signal inputs, and these inputs are coupled to receive the enable signal EN. Consequently, if the number of instructions to skip is zero, then these registers are enabled, and the execution of no instruction is skipped. If, however, the number of instructions to skip as supplied to multiplexer 324 is not zero, then multiplexer 324 initially couples the value on its "10" input to its output. The number of instructions to skip is therefore clocked into register 325. Because the value supplied to comparator 326 is non-zero, the enable signal EN is not asserted and the registers listed above are disabled (not enabled). This disabling prevents execution of an instruction. On the next clocking of the pipeline, the decremented number of instructions to skip (as output by decrementer 330) is passed back through multiplexer 324 and is latched into register 325. This process of decrementing the number of instructions to be skipped, clock cycle by clock cycle, is continued until the decremented number equals zero. When the decremented number equals zero, then the comparator 326 causes the enable signal EN to be asserted, which in turn stops the skipping of execution of instructions. Due to the enable signal EN having been deassserted for a number of clock cycles, execution of the appropriate number of instructions is prevented.

If a tripwire instruction is executed, then four bits of data 333, the valid bit 334, and the hit bit 335 are supplied onto six conductors 331. Fields in the tripwire instruction determine what data is supplied onto these conductors as the tripwire data. The picoengine has a predetermined and hardwired 6-bit picoengine number, identifying it as one of the forty-eight picoengines of the pool. This 6-bit picoengine number 332 is merged with the six bits on conductors 331 to make the 12-bit tripwire value 161. If the tripwire instruction is to be skipped, then the enable signal EN at the time the tripwire instruction is being processed in the execute stage, is a digital "0". Accordingly, if the enable signal EN is a digital "0", then AND gate 336 supplies a digital "0" into the select input of multiplexer circuit 337, thereby causing multiplexer circuit 337 to supply the twelve "0" bits on its "0" input leads to its twelve output leads. Therefore the twelve bits driven on the picoengine bus are all digital "0"s. If, however, the tripwire instruction is not to be skipped, then the enable bit EN is a digital "1". Under such a condition, if there is a valid tripwire value to be output, then the picoengine is to output the tripwire value 161 onto the tripwire bus of the picoengine. Accordingly, if the enable signal is a digital "1" and the valid bit signal 334 is a digital "1", then the AND gate 336 supplies a digital "1" onto the select input lead of the multiplexer circuit 337, thereby causing multiplexer circuit 337 to supply the 12-bit tripwire value 161 on its "1" input leads to its twelve output leads.

Figure 32:
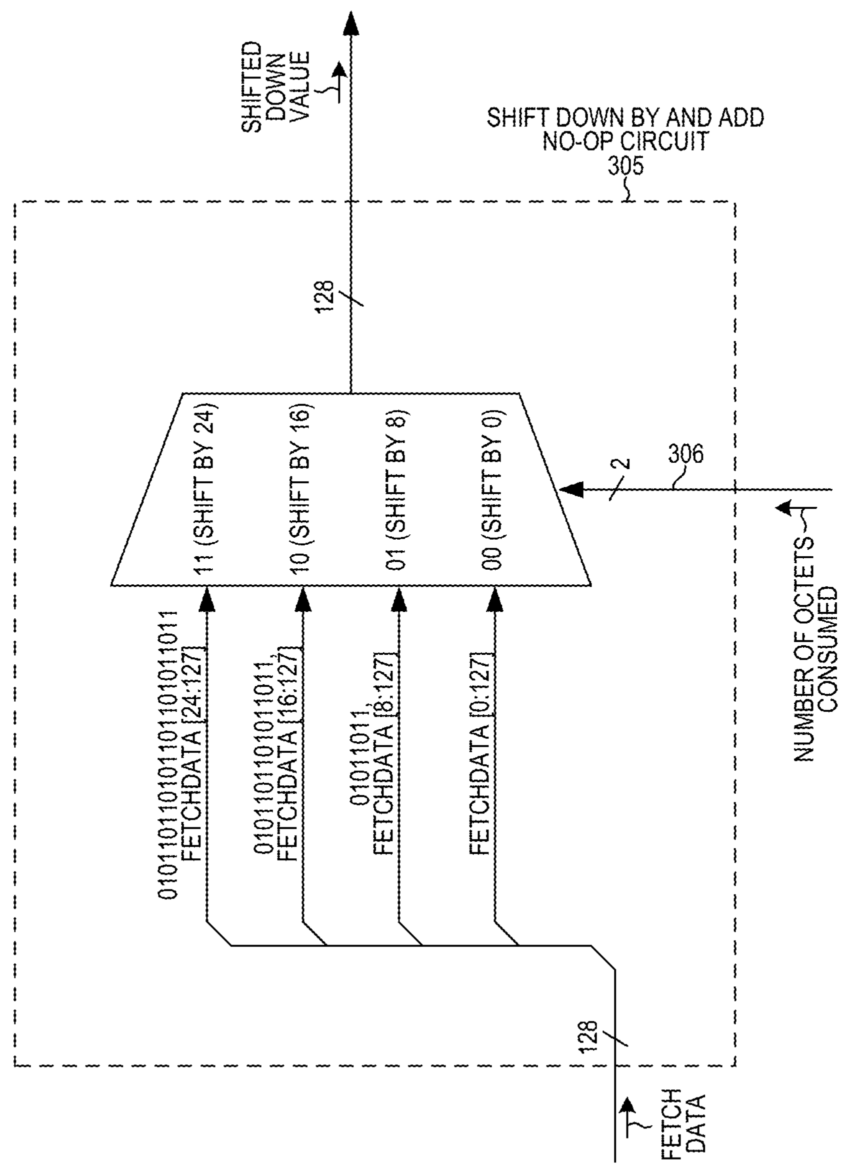
FIG. 32 is a more detailed diagram of the shifter 305 of FIG. 31.

FIG. 32 is a more detailed diagram of shifter 305.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An integrated circuit comprising:

a first pool of processors, wherein each of the processors has a tripwire bus port, wherein each of the processors can decode and execute a tripwire instruction, wherein execution of the tripwire instruction causes a valid multi-bit value to be output from the processor onto the tripwire bus port of the processor; and a tripwire data merging and collision detection circuit (TDMCDC), wherein the TDMCDC is coupled to the tripwire bus port of each of the processors of the pool, wherein: 1) if more than one of the processors is outputting a valid multi-bit value onto its tripwire bus port at a given time then the TDMCDC asserts a collision bit signal and supplies the asserted collision bit signal onto a set of conductors; 2) if one and only one of the processors is outputting a valid multi-bit value onto its tripwire bus port at a given time then the TDMCDC supplies the valid multi-bit value onto the set of conductors along with a deasserted collision bit signal; 3) if none of the processors is outputting a valid multi-bit value onto its tripwire bus port at a given time then the TDMCDC does not output a valid multi-bit value onto the set of conductors.

2. The integrated circuit of claim 1, further comprising:

an event bus comprising a plurality of event ring circuits, wherein the set of conductors extends from the TDMCDC and into an event ring circuit of the event bus; and a plurality of terminals and debug interface circuitry, wherein the a multi-bit value output by one of the processors as a result of the processor executing a tripwire instruction is communicated through the TDMCDC from the processor to an event ring circuit and then through the event bus to the debut interface circuitry and then out of the integrated circuit via the plurality of terminals.

3. The integrated circuit of claim 2, further comprising:

a second pool of processors, wherein each processor of the second pool has a tripwire bus port, wherein each processor of the second pool can decode and execute a tripwire instruction, wherein execution of the tripwire instruction causes a valid multi-bit value to be output from the processor onto the tripwire bus port of the processor, and wherein the TDMCDC is coupled to the tripwire bus port of each processor of the second pool.

4. The integrated circuit of claim 3, wherein the integrated circuit comprises a plurality of islands, wherein the first pool of processors is disposed on a first of the islands, wherein the second pool of processors is disposed on a second of the islands, and wherein the event bus extends through both the first and second islands.

5. The integrated circuit of claim 1, wherein each of the processors has an associated number, and wherein a multi-bit value output by a processor onto its tripwire bus port as a result of the processor executing a tripwire instruction includes a first multi-bit value and a second multi-bit value, wherein the second multi-bit value is the number of the processor.

6. The integrated circuit of claim 1, wherein the multi-bit value output by a processor as a result of the processor executing a tripwire instruction includes a first multi-bit value and a second multi-bit value, wherein the first multi-bit value is a value that was stored in a register file of the processor.

7. The integrated circuit of claim 6, wherein there are multiple different types of tripwire instructions, and wherein the multi-bit value further includes an indication of the type of tripwire instruction that caused the multi-bit value to be output onto the TDMCDC.

8. The integrated circuit of claim 1, wherein all the processor are clocked by a common clock signal, wherein the TDMCDC includes a plurality of registers, and wherein all the registers of the TCMCDC are clocked by the common clock signal.

9. The integrated circuit of claim 1, wherein the tripwire bus port of a processor only carries a valid multi-bit value if the processor is actively processing a tripwire instruction.

10. The integrated circuit of claim 9, wherein the processor is clocked by a clock signal, and wherein the processor outputs a valid multi-bit value onto its tripwire bus port for one and only one clock cycle during a time when the processor is actively processing a tripwire instruction.

11. The integrated circuit of claim 10, wherein none of the processors of the first pool can perform a write to any memory.

12. The integrated circuit of claim 1, wherein each of the processors fetches instructions from a memory, and wherein none of the processors can write to any memory from which it fetches instructions.

13. The integrated circuit of claim 2, wherein the event bus serially communicates event packets from one event ring circuit to event ring circuit of the event bus, and wherein valid multi-bit values output by processors as a result of executing tripwire instructions are communicated as parts of event packets via the event bus to the debug interface circuitry.

14. A method comprising:

(a) executing a tripwire instruction in a first processor and as a result of the executing of (a) outputting a valid multi-bit tripwire value from the first processor onto a tripwire bus port of the first processor;

(b) executing a tripwire instruction in a second processor and as a result of the executing of (b) outputting a valid multi-bit tripwire value from the second processor onto a tripwire bus port of the second processor; and (c) receiving the valid multi-bit tripwire value from the first processor and receiving the valid multi-bit tripwire value from the second processors and supplying multi-bit tripwire values one by one to a debug interface circuit, wherein each multi-bit tripwire value is supplied to the debug interface circuit along with a collision bit, wherein the collision bit indicates whether multiple multi-bit tripwire values were received from processors at the same time.

15. The method of claim 14, wherein each multi-bit tripwire value received in (c) includes a first multi-bit value, a second multi-bit value, wherein the second multi-bit value that identifies the processor that generated the multi-bit tripwire value.

16. An integrated circuit comprising:

debug interface circuitry;

a pool of processors, wherein each processor of the pool has a tripwire bus port, wherein each of the processors can decode and execute a tripwire instruction, wherein execution of the tripwire instruction causes a valid multi-bit tripwire value to be output from the processor onto the tripwire bus port of the processor; and means for merging multi-bit tripwire values received from the processors and for supplying multi-bit tripwire values to the debug interface circuitry, wherein the means is also for: 1) supplying an asserted collision bit signal to the debug interface circuitry if more than one of the processors is outputting a valid multi-bit tripwire value onto its tripwire bus port at a given time; 2) supplying a deasserted collision bit signal to the debug interface circuitry if one and only one of the processors is outputting a valid multi-bit value onto its tripwire bus port at a given time, and supplying the valid multi-bit value to the debug interface circuitry along with the deasserted collision bit signal; 3) not supplying a valid multi-bit value to the debug circuitry if none of the processors is outputting a valid multi-bit value onto its tripwire bus port at a given time.

17. The integrated circuit of claim 16, wherein the means supplies the multi-bit tripwire data values to the debug interface circuitry via an event bus, and wherein the event bus communicates the multi-bit tripwire data values in the form of event packets.

18. The integrated circuit of claim 16, wherein the means outputs multi-bit tripwire values onto a set of conductors along with the collision bit signal, and wherein the means drives the conductors of the set of conductors other than the conductor that carries the collision bit signal with identical digital logic values if the means is not supplying a valid multi-bit value to the debug circuitry due to none of the processors outputting a valid multi-bit value.

19. The integrated circuit of claim 16, wherein a valid multi-bit tripwire value comprises a first multi-bit value and a second multi-bit value, and wherein the first multi-bit value is a value output by a register file of the processor that output the valid multi-bit tripwire value.

20. The integrated circuit of claim 16, wherein a valid multi-bit tripwire value comprises a first multi-bit value and a second multi-bit value, and wherein the second multi-bit value is a processor number that identifies the processor that output the valid multi-bit tripwire value.

* * * * *